US011709657B2

(12) United States Patent
Paraiso et al.

(10) Patent No.: US 11,709,657 B2
(45) Date of Patent: Jul. 25, 2023

(54) HIGH BANDWIDTH QUANTUM RANDOM NUMBER GENERATOR

(71) Applicant: Kabushiki Kaisha Toshiba, Minato-ku (JP)

(72) Inventors: Taofiq Paraiso, Cambridge (GB); Davide Marangon, Cambridge (GB); Thomas Roger, Cambridge (GB); Zhiliang Yuan, Cambridge (GB); Andrew Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 653 days.

(21) Appl. No.: 16/804,286

(22) Filed: Feb. 28, 2020

(65) Prior Publication Data

US 2020/0301669 A1 Sep. 24, 2020

(30) Foreign Application Priority Data

Mar. 18, 2019 (GB) ...................................... 1903675

(51) Int. Cl.
*G06F 7/58* (2006.01)
*G06N 10/00* (2022.01)
(Continued)

(52) U.S. Cl.
CPC ................ *G06F 7/588* (2013.01); *G01J 9/02* (2013.01); *G06N 10/00* (2019.01); *H01S 5/0428* (2013.01);
(Continued)

(58) Field of Classification Search
CPC . G06F 7/588; G01J 9/02; G06N 10/00; H01S 5/0428; H01S 5/4012;
(Continued)

(56) References Cited

U.S. PATENT DOCUMENTS

2012/0328290 A1 12/2012 Yuan et al.
2015/0029575 A1 1/2015 Hara et al.
(Continued)

FOREIGN PATENT DOCUMENTS

CN 106445465 A 2/2017
CN 206348777 U 7/2017
(Continued)

OTHER PUBLICATIONS

Japanese Office Action dated Feb. 16, 2021 in Japanese Patent Application No. 2020-032085 (with English translation), 8 pages.
(Continued)

*Primary Examiner* — Ajay Ojha
(74) *Attorney, Agent, or Firm* — Oblon, McClelland, Maier & Neustadt, L.L.P.

(57) ABSTRACT

An optical device for a quantum random number generator comprising:
a source of phase randomised pulses of light, the source of phase randomised pulses of light further comprising a plurality of gain-switched lasers, each gain-switched laser having an output, and each gain-switched laser being configured to emit a stream of pulses such that the phase of each pulse in the stream of pulses is randomised, and
an optical pulse combiner, the optical pulse combiner being configured to receive streams of pulses from the output of each gain-switched laser, combine the streams of pulses with one another into a combined stream of pulses and direct the combined stream of pulses into at least one output of the optical pulse combiner, the at least one output of the optical pulse combiner being the output of the source of phase randomised pulses of light;
wherein the source of phase randomised pulses of light is configured such that the streams of pulses of light
(Continued)

emitted by the plurality of gain-switched lasers are temporally offset relative to one another, a phase measurement element, the phase measurement element being configured to receive the combined stream of pulses from the output of the source of phase randomised pulses of light; and an optical detector, the optical detector being optically coupled to the phase measurement element.

19 Claims, 18 Drawing Sheets

(51) Int. Cl.
  *G01J 9/02* (2006.01)
  *H01S 5/042* (2006.01)
  *H01S 5/40* (2006.01)
  *H01S 5/12* (2021.01)
  *H04L 9/08* (2006.01)

(52) U.S. Cl.
  CPC .............. *H01S 5/12* (2013.01); *H01S 5/4012* (2013.01); *H04L 9/0852* (2013.01); *H04L 9/0869* (2013.01)

(58) Field of Classification Search
  CPC .... H01S 5/02325; H01S 5/026; H01S 5/0424; H01S 5/04257; H01S 5/12; H01S 5/227; H01S 5/4031; H01S 5/0085; H01S 5/4006; H01S 5/06226; H01S 2301/176; H01S 5/06216; H04L 9/0852; H04L 9/0869; H04L 9/0662
  See application file for complete search history.

(56) References Cited

U.S. PATENT DOCUMENTS

| | | | |
|---|---|---|---|
| 2015/0331672 A1 | 11/2015 | Yuan et al. | |
| 2016/0047643 A1 | 2/2016 | Yuan et al. | |
| 2017/0115960 A1* | 4/2017 | Pruneri | H01S 5/065 |
| 2017/0237505 A1* | 8/2017 | Lucamarini | H04L 9/0858 |
| | | | 398/185 |

FOREIGN PATENT DOCUMENTS

| | | |
|---|---|---|
| GB | 2529228 A | 2/2016 |
| JP | 2013-13073 A | 1/2013 |
| JP | 5370559 B2 | 12/2013 |
| JP | 2016-6629 A | 1/2016 |
| JP | 2016-42694 A | 3/2016 |

OTHER PUBLICATIONS

Z. L. Yuan, et al. "Robust random number generation using steady-state emission of gain-switched laser diodes", Applied Physics Letters, vol. 104, No. 26, 2014, 6 pages.

Thomas Roger, et al., "Real-time interferometric quantum random number generation on chip", Journal of the Optical Society of America B, vol. 36, No. 3, 2019, 6 pages.

Miquel Rudé, et al., "Phase diffusion quantum entropy source on a silicon chip", Optics Letters, arXiv:1804.04482v1, Apr. 12, 2018, 5 pages.

Shi-Hai Sun, et al., "Experimental study of a quantum random-number generator based on two independent lasers", Physical Review A, vol. 96, No. 6, 2017, 7 pages.

Carlos Abellan, et al. "Quantum entropy source on an InP photonic integrated circuit for random number generation", Optica, vol. 3, No. 9, 2016, pp. 989-994.

You-Qi Nie, et al., "68 Gbps quantum random number generation by measuring laser phase fluctuations", Pan Review of Scientific Instruments 86, arXiv:1506.00720v1, Jun. 2, 2015, 14 pages.

Feihu Xu, et al., "Ultrafast quantum random number generation based on quantum phase fluctuations", Optics Express vol. 20, No. 11, 2012, 12 pages.

Francesco Raffaelli, et al., "Generation of random numbers by measuring phase fluctuations from a laser diode with a silicon-on-insulator chip", Optics Express, vol. 26, No. 16, 2018, pp. 19730-19741.

Davide G. Marangon, et al., "Long-Term Test of a Fast and Compact Quantum Random Number Generator", Journal of Lightwave Technology, vol. 36, No. 17, arXiv:1807.03989v1, Jul. 11, 2018, 9 pages.

* cited by examiner

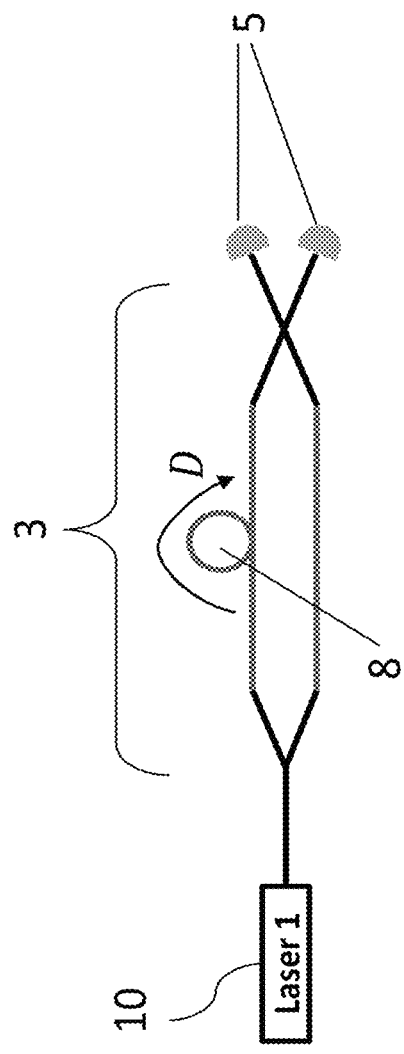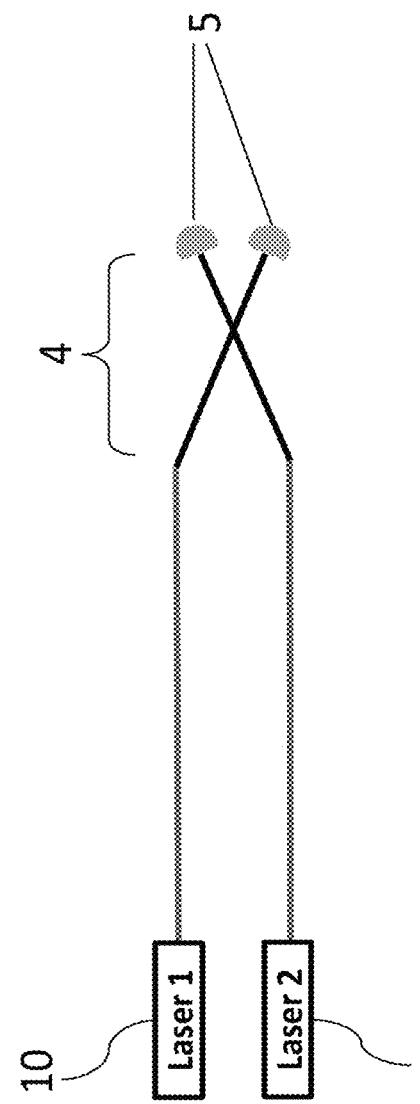
Figure 1(a)
Figure 1(b)

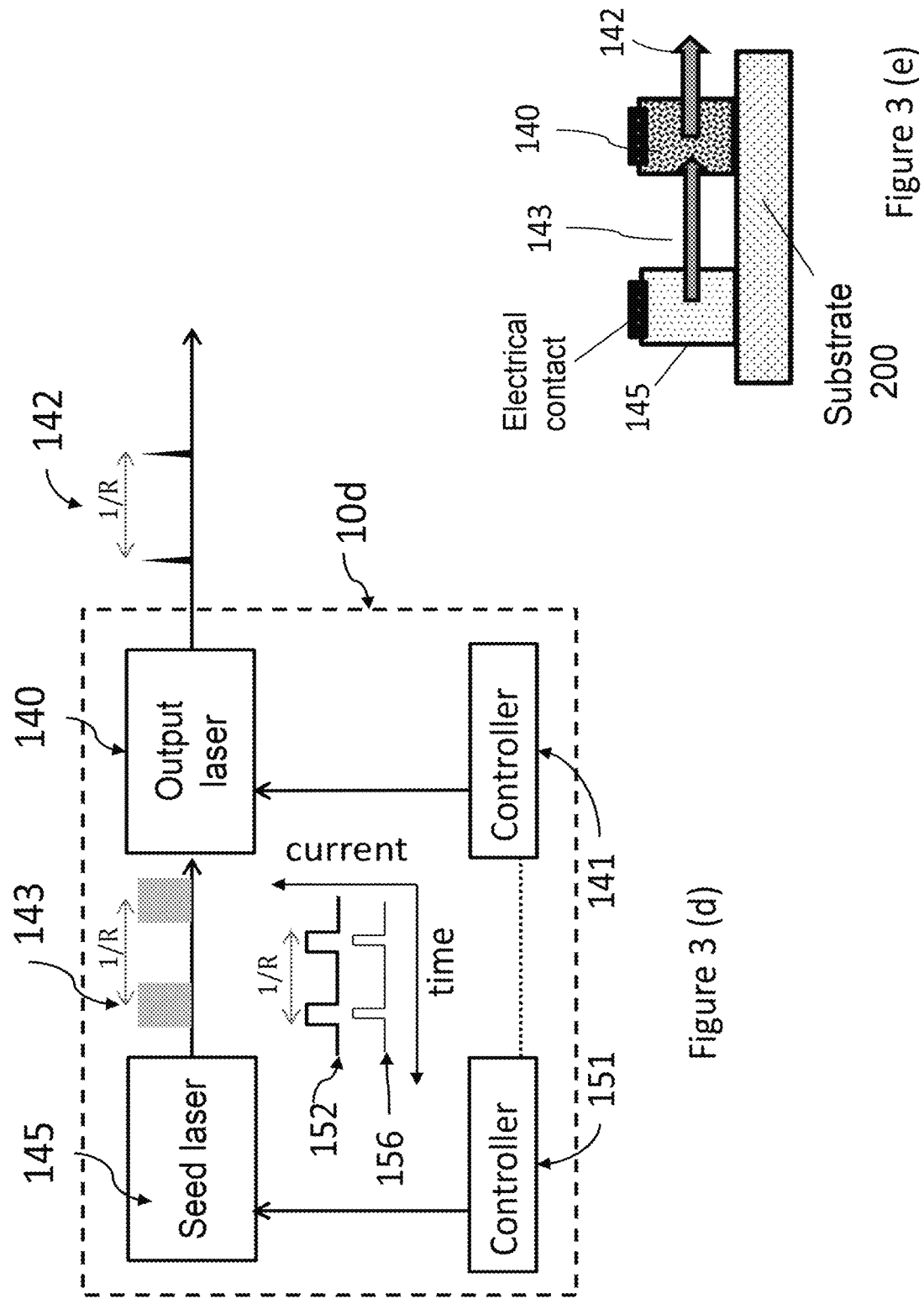

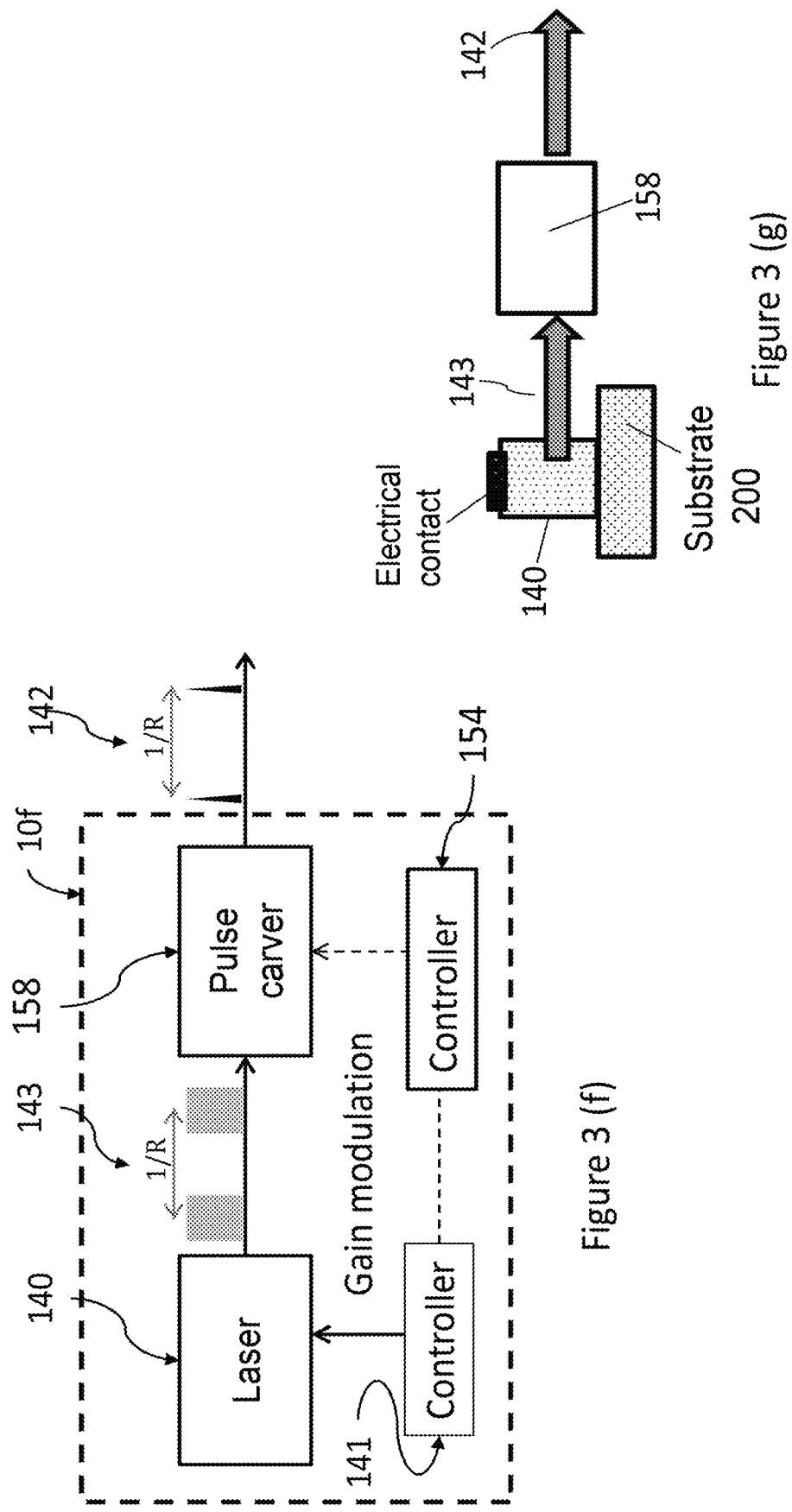

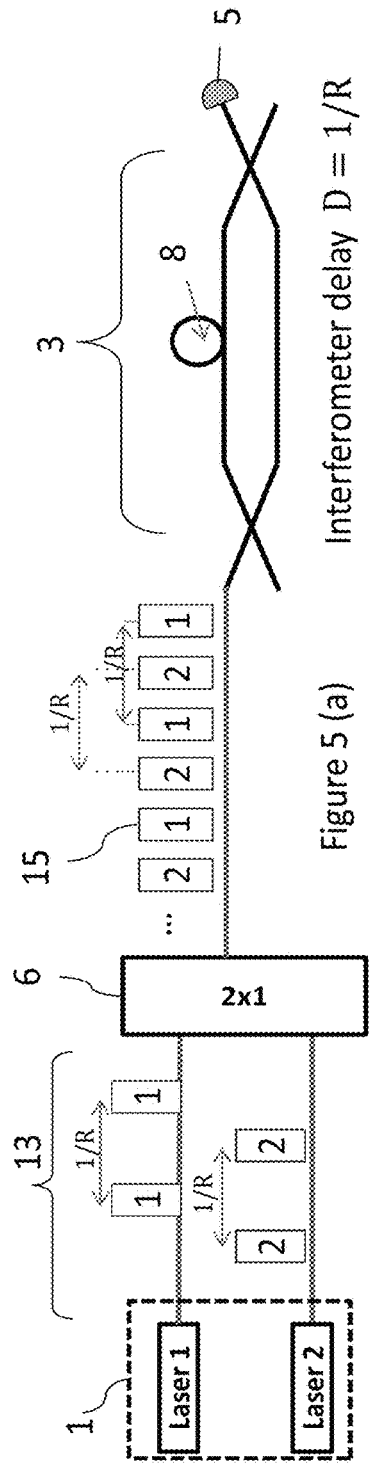
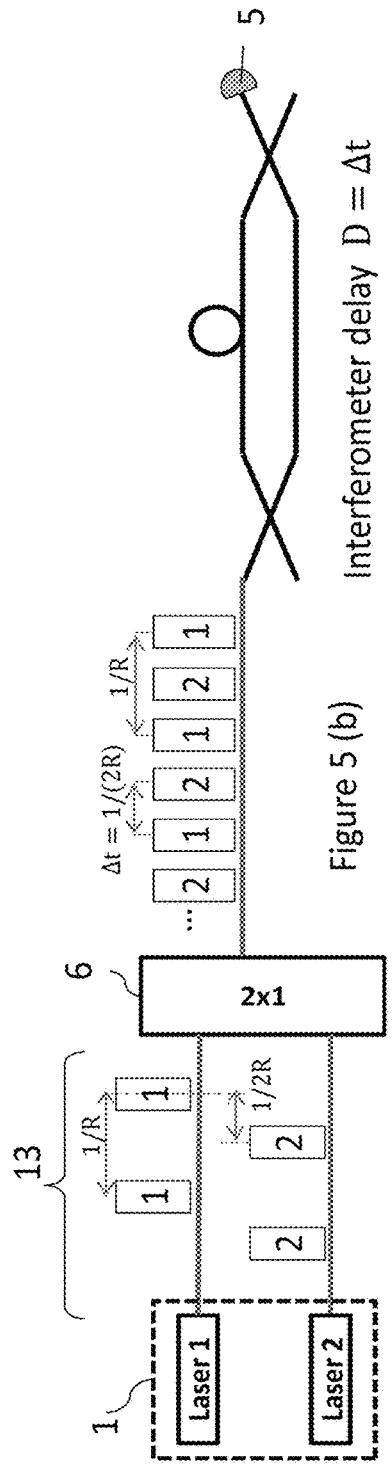
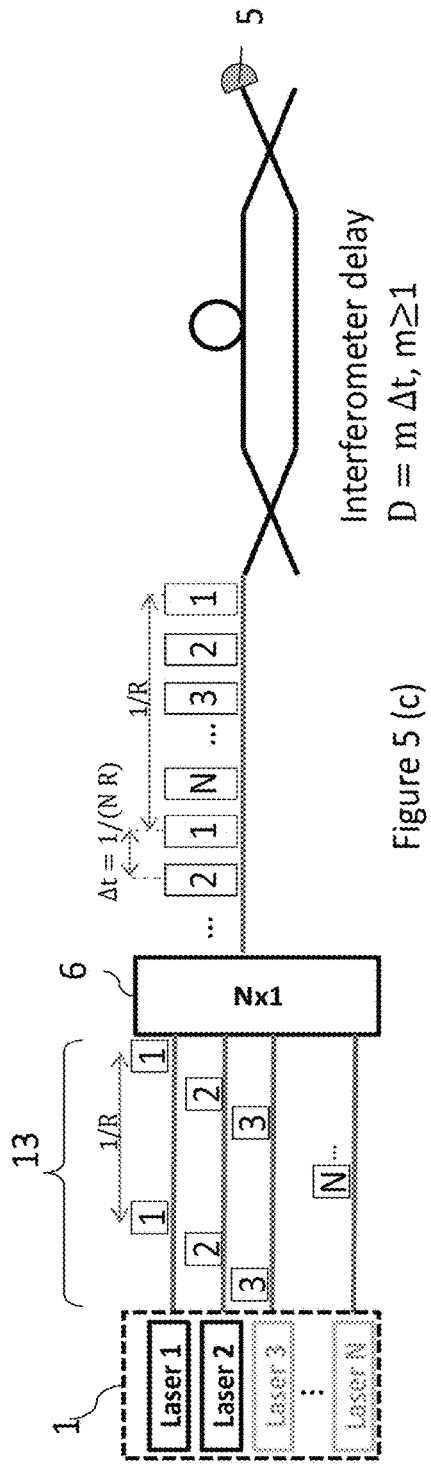
Figure 5(a)
Figure 5(b)
Figure 5(c)

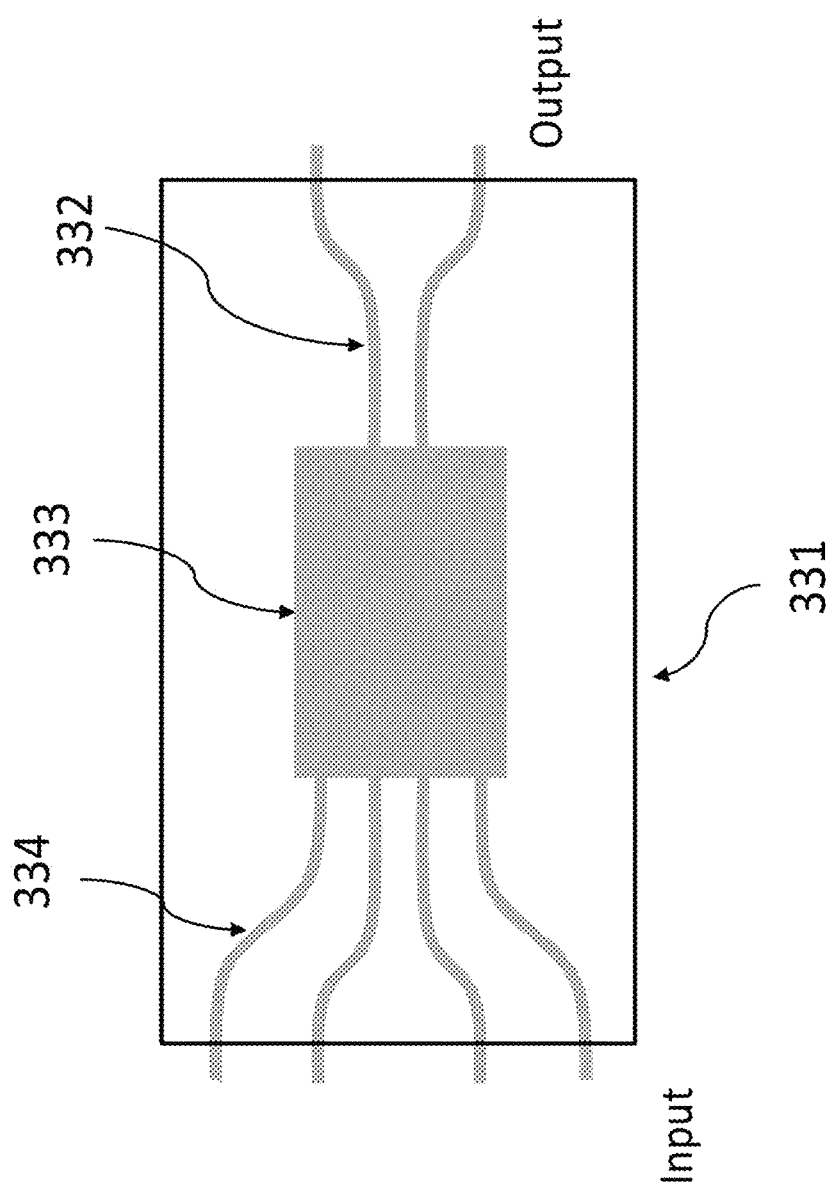

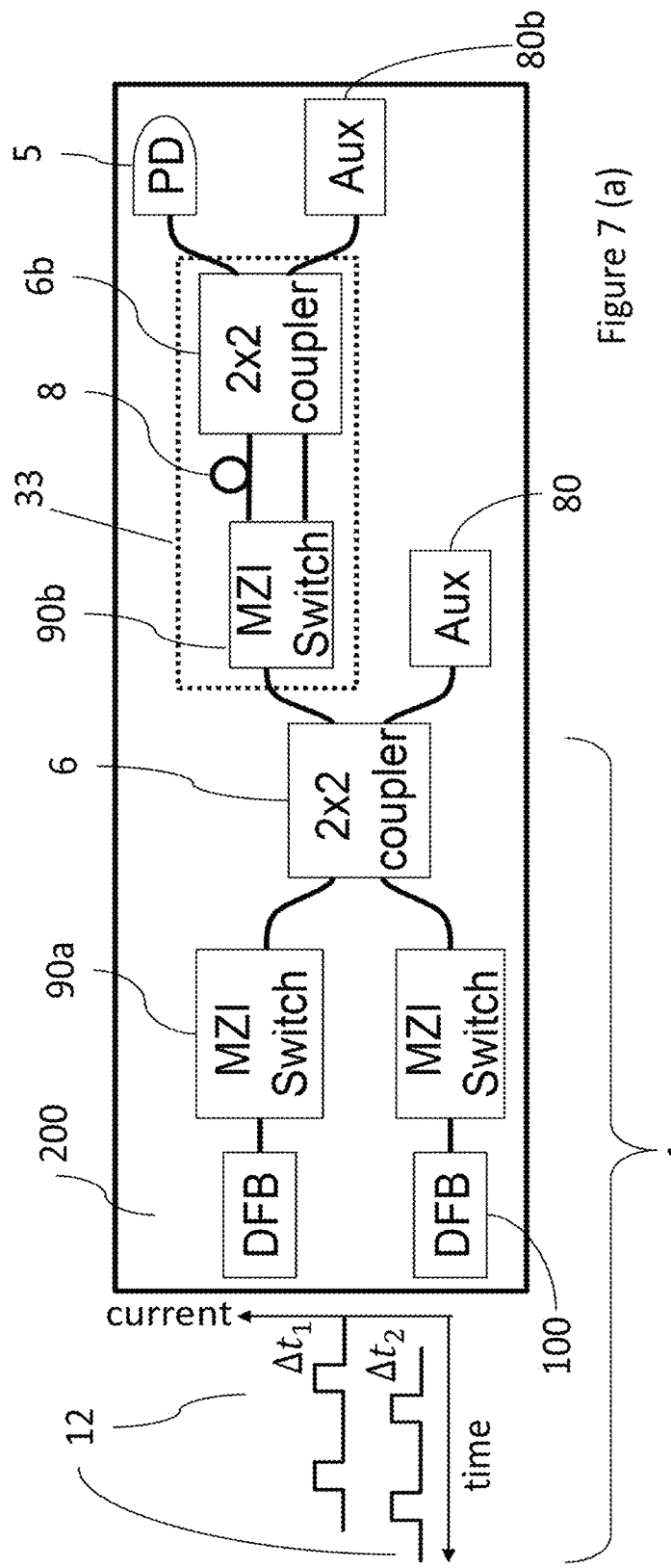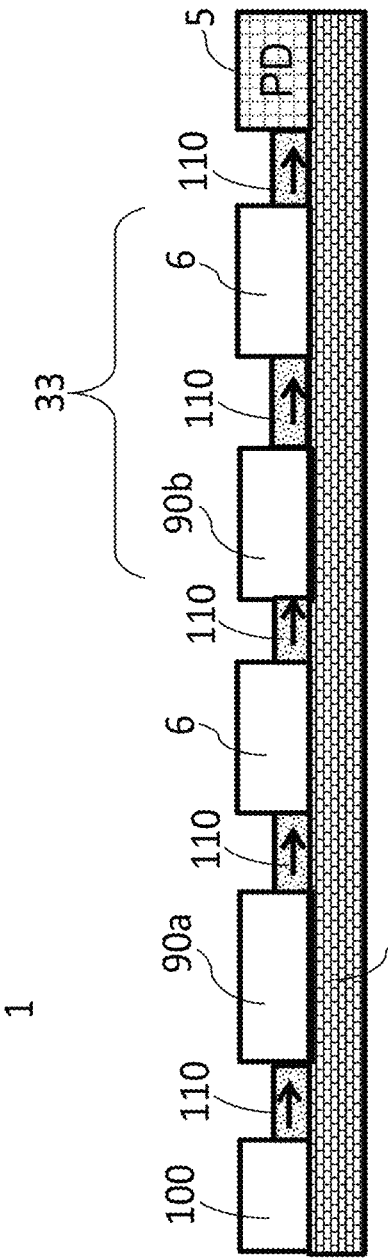

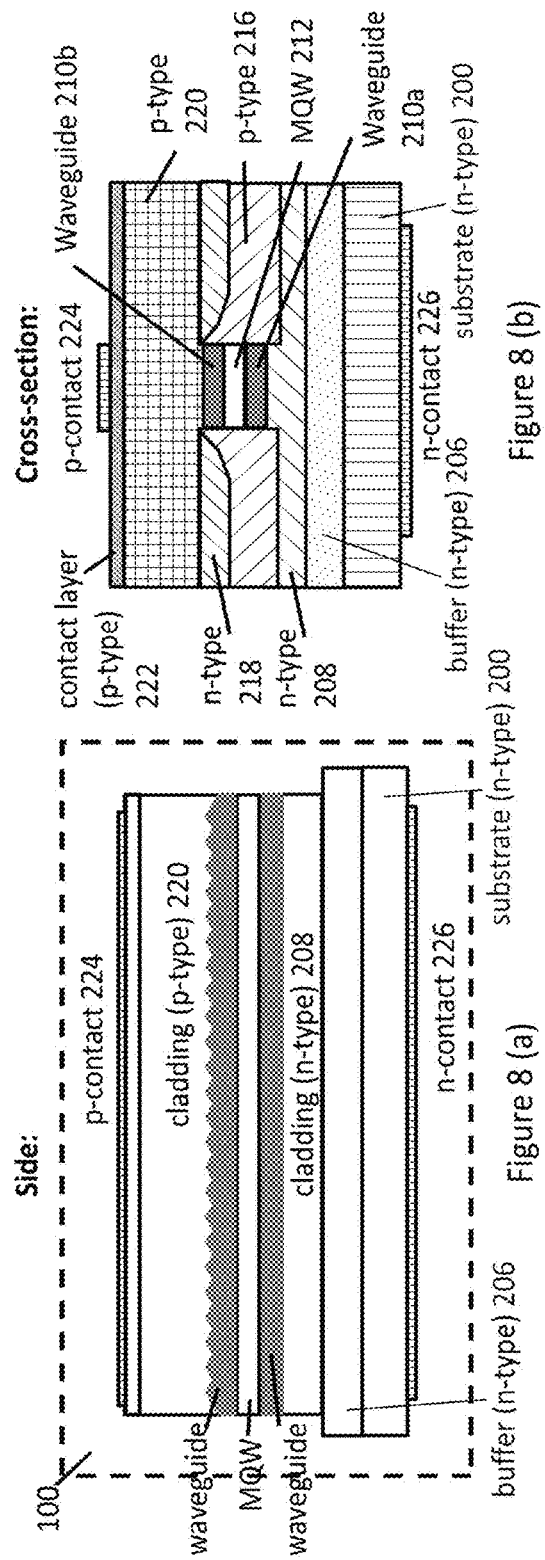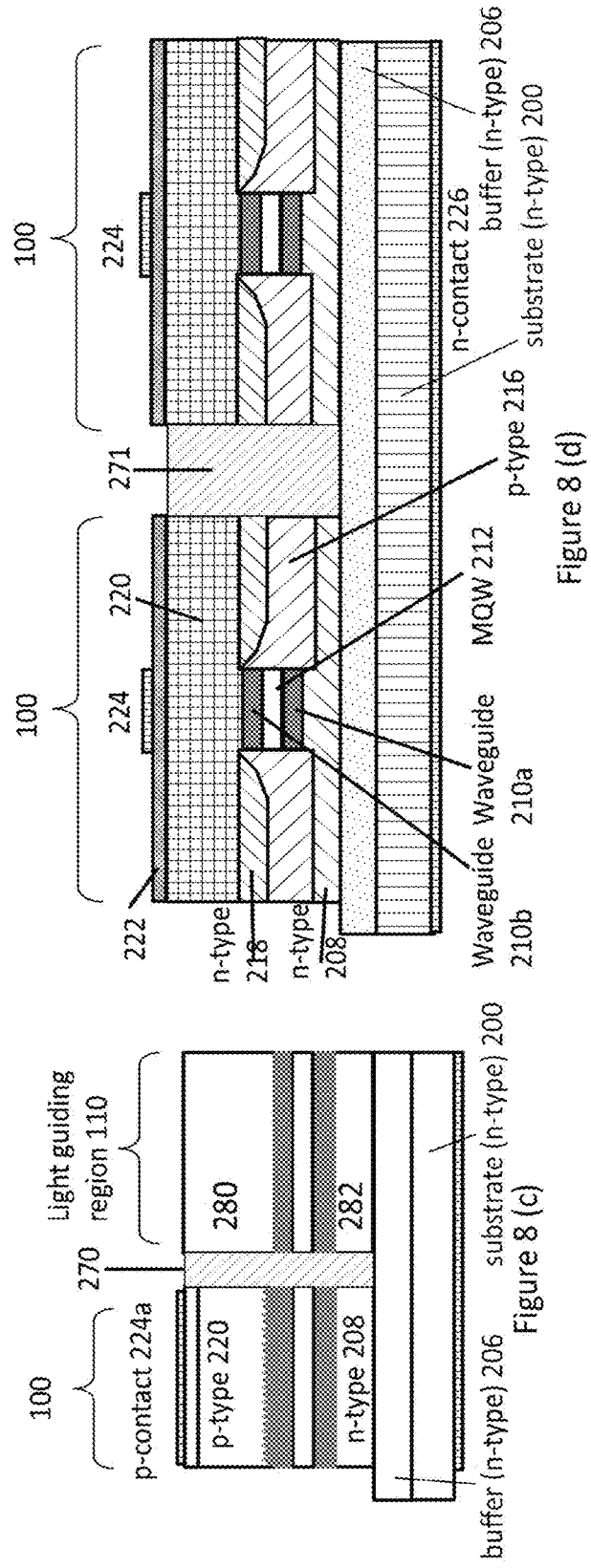

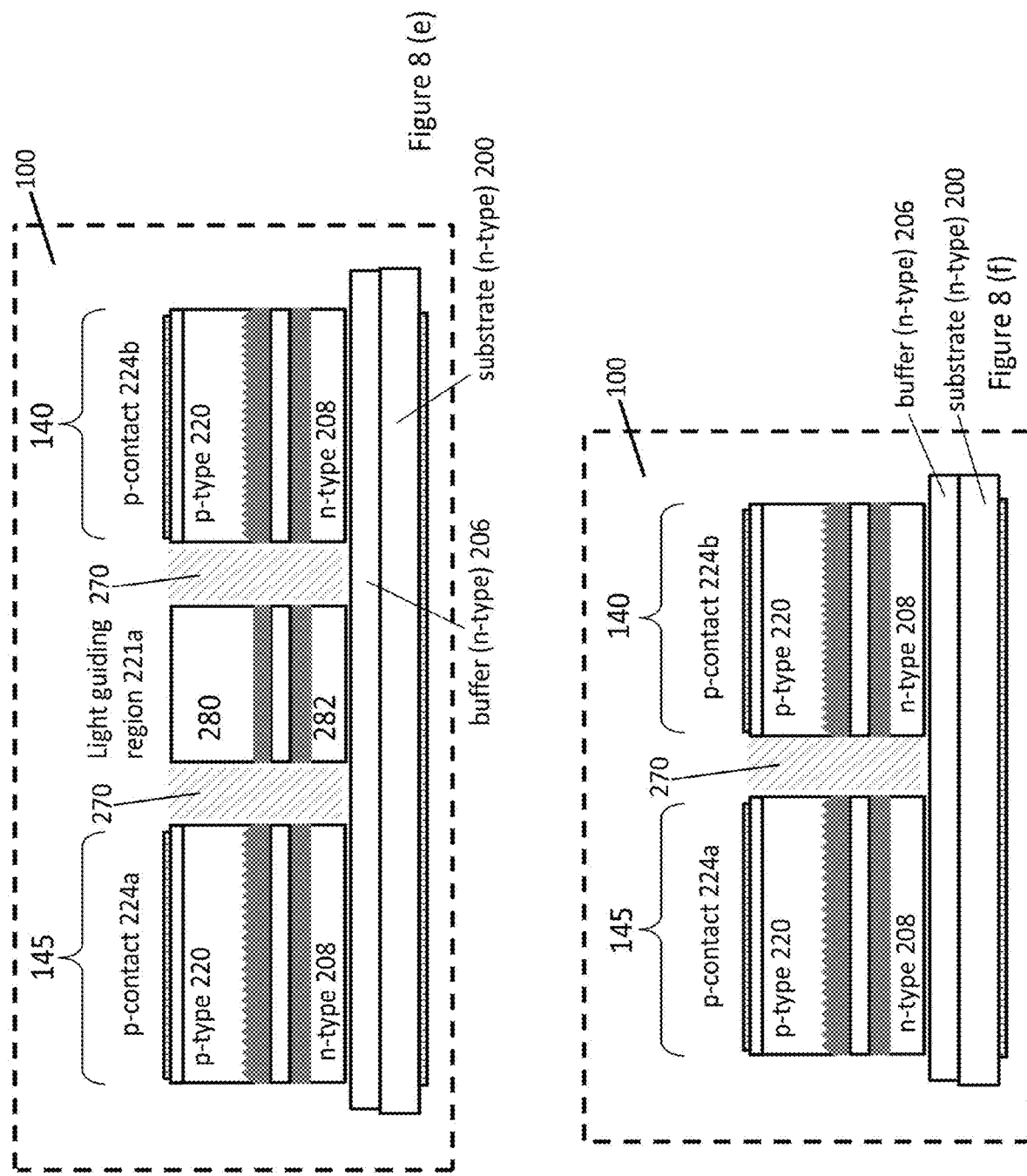

HIGH BANDWIDTH QUANTUM RANDOM NUMBER GENERATOR

CROSS-REFERENCE TO RELATED APPLICATIONS

This application is based upon and claims the benefit of priority from prior United Kingdom Application number 1903675.5 filed on 18 Mar. 2019, the entire contents of which are incorporated herein by reference.

FIELD

Embodiments described herein relate to quantum random number generators, and methods of generating random numbers using a quantum mechanical device.

BACKGROUND

A sequence of random numbers exhibits the property that there are no correlations between successive numbers such that the value of a future number from the sequence cannot be predicted better than by random chance. Random numbers are used in a variety of applications including: cryptography—where random numbers are necessary to produce a cryptographic key to allow encryption; numerical simulations—where random numbers are used to produce inputs in e.g. Monte Carlo methods, to simulate the dynamics of systems; or lotteries—where random numbers are necessary in any games involving guessing chance.

Random numbers can be produced from Quantum Random Number Generators (QRNG). In QRNG, the source of randomness is physical and relies on the unpredictability of a measurement, and, in particular, the unpredictability relies on a quantum mechanical property. QRNGs can be implemented using gained-switched diode lasers. In gain-switched diode lasers, the lasing threshold is governed by spontaneous emission, which is a quantum mechanical process, such that the phase of the emitted pulse is random. By repeatedly switching the diode laser on and off, a stream of optical pulses, each having a random phase, can be generated. By measuring the random phase of each optical pulse in the stream of optical pulses, a sequence of random numbers can be obtained.

There is a continuing need to improve the performance of QRNGs based on gain-switched lasers. Furthermore, there is a continuing need to improve the speed of QRNGs based on gain-switched lasers.

BRIEF DESCRIPTION OF THE FIGURES

Devices and methods in accordance with non-limiting embodiments will now be described with reference to the accompanying figures in which:

FIG. 1(a) is a schematic illustration of an optical device for a QRNG according to a comparative example.

FIG. 1(b) is a schematic illustration of an optical device for a QRNG according to another comparative example.

FIG. 5(a) is a schematic illustration of an optical device for a QRNG where each gain-switched laser emits an independent stream of pulses of light and the independent streams of pulses of light are combined to form an interleaved pulse stream and wherein the interferometer delay in the phase measurement system is equal to the temporal separation 1/R between pulses in the stream of pulses emitted by each gain-switched laser.

FIG. 5(b) is a schematic illustration of an optical device for a QRNG where each gain-switched laser emits an independent stream of pulses of light and the independent streams of pulses of light are combined to form an interleaved pulse stream and wherein the interferometer delay in the phase measurement system is equal to the temporal separation between adjacent pulses in the interleaved pulse stream.

FIG. 5(c) is a schematic illustration of an optical device for a QRNG where each gain-switched laser emits an independent stream of pulses of light and the independent streams of pulses of light are combined to form an interleaved pulse stream and wherein the interferometer delay in the phase measurement system is equal to an integer multiple of the temporal separation between adjacent pulses in the interleaved pulse stream.

FIG. 8(a) shows a side view of a distributed feedback (DFB) semiconductor laser.

FIG. 8(b) shows a cross-section view of the DFB of FIG. 8(a).

FIG. 8(c) shows a side view of a DFB laser optically coupled to a light guiding region.

FIG. 8(d) shows the structure of an array of two DFB lasers arranged side by side.

FIG. 8(e) shows a side view of a DFB laser comprising a seed laser optically coupled to an output DFB laser via a light guiding region 1.

FIG. 8(f) shows a side view of a DFB laser comprising a seed laser optically coupled to an output DFB laser.

DETAILED DESCRIPTION

Figure 2:
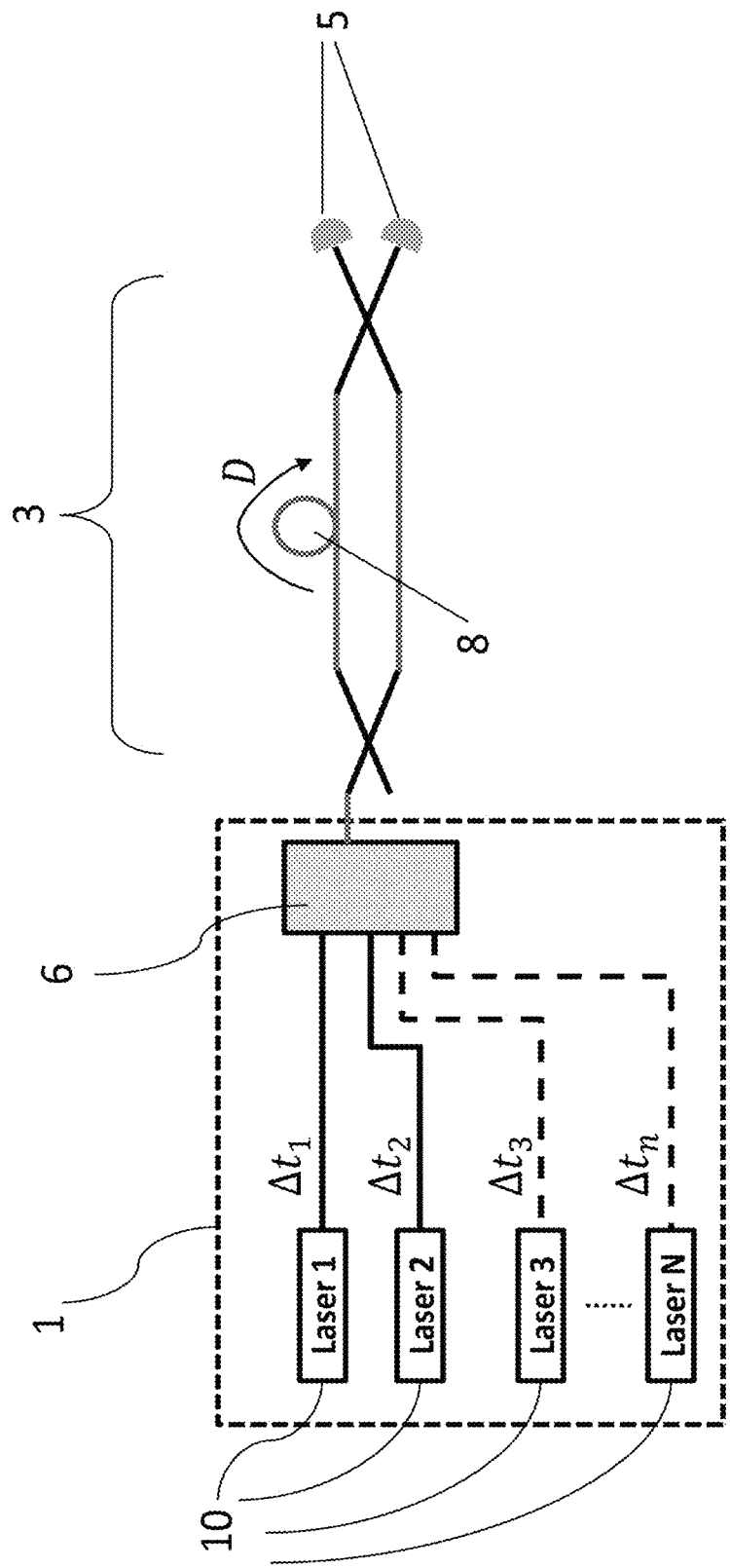
FIG. 2 is a schematic illustration of an optical device for QRNG comprising a source of phase randomised pulses of light, the source of phase randomised pulses of light further comprising a plurality of gain-switched lasers and an optical pulse combiner, a phase measurement element and a photodetector.

In an embodiment, an optical device for a quantum random number generator is provided comprising:
  a source of phase randomised pulses of light, the source of phase randomised pulses of light further comprising
    a plurality of gain-switched lasers, each gain-switched laser having an output, and each gain-switched laser being configured to emit a stream of pulses such that the phase of each pulse in the stream of pulses is randomised, and
    an optical pulse combiner, the optical pulse combiner being configured to receive streams of pulses from the output of each gain-switched laser, combine the streams of pulses with one another into a combined stream of pulses and direct the combined stream of pulses into at least one output of the optical pulse combiner, the at least one output of the optical pulse combiner being the output of the source of phase randomised pulses of light;
    wherein the source of phase randomised pulses of light is configured such that the streams of pulses of light emitted by the plurality of gain-switched lasers are temporally offset relative to one another,
  a phase measurement element, the phase measurement element being configured to receive the combined stream of pulses from the output of the source of phase randomised pulses of light; and
  an optical detector, the optical detector being optically coupled to the phase measurement element.

In a further embodiment, a method of generating random numbers is provided, the method comprising:
  generating phase randomised pulses of light from a source of phase randomised pulses of light, the source of phase randomised pulses of light further comprising
    a plurality of gain-switched lasers, each gain-switched laser having an output, and each gain-switched laser being configured to emit a stream of pulses of light such that the phase of each pulse in the stream of pulses is randomised, and
    an optical pulse combiner, the optical pulse combiner being configured to receive streams of pulses from the output of each gain-switched laser, combine the streams of pulses with one another into a combined stream of pulses and direct the combined stream of pulses into at least one output of the optical pulse combiner, the at least one output of the optical pulse combiner being the output of the source of phase randomised pulses of light; and, wherein the source of phase randomised pulses of light is configured such that the streams of pulses of light emitted by the plurality of gain-switched laser is temporally offset relative to one another;
  measuring the phase of pulses from the source of phase randomised pulses by using a phase measurement element coupled to an optical detector, the phase measurement element being configured to receive the combined stream of pulses from the output of the source of phase randomised pulses of light.

A laser based QRNG exploits the phase randomization in gain-switched lasers. The phased randomised pulses are generated in, for example, gain-switched diode lasers, and the random phases are measured using a phase measurement element.

In one approach, pulses from a single gain-switched laser are sent to a phase measurement element. The phase measurement element is also referred to as a delay line interferometer where each incoming pulse is split into two pulses, one pulse being delayed, and one pulse being non-delayed. The delayed pulse originating from the incoming pulse is made to interfere with the non-delayed pulse originating from a subsequent incoming pulse. The signal corresponding to the intensity of the interfered pulse is measured using a photodetector and the measured signal represents a random number.

In another approach, two lasers (one pulsed and one in continuous wave regime) are made to interfere with each other. In another approach, two lasers are pulsed and pulses emitted by each laser are made to interfere with each other. The signal corresponding to the intensity of the interfered signal is then measured using a photodetector and the measured signal represents a random number.

In the approaches above, the pulsed lasers cannot be switched on and off at a too high rate otherwise the phase relationship between consecutive pulses is no longer random. To guarantee random phases between consecutive pulses, the carrier density in the diode laser must be allowed to drop. Therefore, there is a limit to the maximum rate at which a diode laser can generate phase randomised pulses and hence there is a limit to the rate of random number generation.

The disclosed QRNG and method of generating random numbers provide an improvement to the performance and speed of QRNGs based on pulsed lasers by: realising that the photodetectors used in pulsed laser based QRNGs can operate at a faster rate that the pulsed lasers; combining phase randomised pulses generated at a lower rate from each pulsed laser from a plurality of pulsed lasers to form a combined pulse sequence of phase randomised pulses to achieve a higher rate of randomised pulse generation; and measuring the phases of the phase randomised pulses.

In an embodiment, the phase measurement element is a time delay interferometer and is configured to direct light from the at least one output of the source of phase randomised pulses towards two arms, at least one arm comprising an interferometer delay, and wherein light from the two arms are interfered with each other and directed to the output of the phase measurement element.

The source of phase randomised pulses of light may be configured such that the stream of pulses of light from each gain-switched laser is directed into a delay element, each delay element providing a different amount of delay, and each delayed stream of pulses of light being directed into the optical pulse combiner. The streams of pulses of light emitted by the plurality of gain-switched lasers may also be temporally synchronised.

In a further embodiment, the modulation currents are injected into each of the plurality of gain-switched lasers and the modulation currents are temporally synchronised.

In a further embodiment, each gain-switched laser is configured to emit a stream of pulses of light such that the streams of pulses of light from each gain-switched laser are temporally offset relative to one another.

In one embodiment the modulation currents are injected into each of the plurality of gain-switched lasers and the modulation currents are temporally offset relative to one another.

In an embodiment, the interferometer delay in the phase measurement element is equal to a temporal separation between pulses in the stream of pulses emitted by each gain-switched laser.

In a further embodiment, the interferometer delay in the phase measurement element is equal to a temporal separation between adjacent pulses in the stream of pulses output at the least one output of the optical pulse combiner.

In a yet further embodiment, the interferometer delay in the phase measurement element is equal to an integer multiple of a temporal separation between adjacent pulses in the stream of pulses output at the least one output of the optical pulse combiner.

The pulses in the stream of pulses emitted by each gain-switched laser may have a temporal separation greater than or equal to 200 ps.

The pulses in the stream of pulses emitted by each gain-switched laser may have a width less than or equal to half the temporal separation between adjacent pulses in the stream of pulses output at the at least one output of the optical pulse combiner.

In the above embodiments, each gain-switched laser may comprise a seed laser optically coupled to an output laser. Also, each gain-switched laser may comprise a gain-switched laser optically coupled to a pulse carver.

In an embodiment, the source of phase randomised pulses of light, the optical pulse combiner, the phase measurement element, and the optical detector are integrated on a first substrate.

In a further embodiment:
the plurality of gain-switched lasers are disposed on a first substrate;
the optical pulse combiner and the phase measurement element are integrated on a second substrate; and
light emitted by the plurality of gain-switched lasers is optically coupled to the optical pulse combiner via an optical interconnect.

The first substrate may comprise InP and/or the second substrate may comprise Si.

In a further embodiment, the numerical value provided by the photodetector is processed using a randomness extractor algorithm.

FIG. 1 (a) is a schematic illustration of an optical device for a QRNG. The device comprises a single pulsed laser 10 driven at a fixed repetition rate to output a steam of pulses. When the repetition rate is low enough, each pulse from the stream of pulses may have a random phase. The pulses are coupled into a reference and into a long arm of the time delay interferometer 3. The time delay interferometer 3 is also referred to as an asymmetric Mach Zehnder interferometer (AMZI). The long arm of the time delay interferometer comprises a delay element 8, which delays the pulses by a time D with respect to the pulses travelling in the reference arm. The delay element 8 is configured such that the delay D introduced is such that each delayed pulse temporally overlaps with a previous reference pulse in the reference arm. The delayed and reference pulses interfere in a 2×2 directional coupler or beam splitter in the time delay interferometer 3, and the interfered pulses are sent to a photodetector where the intensities of the interfered pulses are converted to a signal. The signal corresponding to the intensities of the interfered pulses has a random value because the phases of the reference and delayed pulses are random. Random numbers may be generated from the random intensities of the interfered pulses.

FIG. 1(b) is a schematic illustration of another type of optical device for a QRNG. Two independent pulsed lasers, laser 1 and laser 2, are driven at equal repetition rates. The two lasers output light at the same intensity and wavelengths. When the repetition rate is low enough, each pulse from the stream of pulses may have a random phase. Furthermore, the streams of pulses from each laser are independent from each other and therefore the pulses from each laser have random phases relative to each other. The pulses from the two lasers temporally overlap and are interfered in a 2×2 directional coupler or a beam splitter 4. The interfered signal is sent to a photodetector 5 where the intensity of the interfered pulse is converted to a signal. The signal corresponding to the intensity of the interfered pulse has a random value because the phases of the pulses from laser 1 and laser 2 are random. Random numbers may be generated from the random intensity of the interfered pulses.

In the examples of FIGS. 1(a) and 1(b), the random number generation rate is linearly proportional to the rate at which pulses interfere, and the rate at which pulses interfere is equal to the repetition rate of the lasers. The repetition rate of the lasers has a maximum value beyond which the phase relationship between consecutive pulses is no longer random. Therefore, the random number generation rate is limited to that value.

FIG. 2 is a schematic illustration of an optical device for a QRNG in accordance with an embodiment. The optical device comprises a source 1, wherein the source 1 further comprises a plurality of gain-switched lasers, each gain-switched laser having an output, and the output of each laser being directed into an optical pulse combiner 6, the optical pulse combiner 6 being configured to combine the light emitted by each gain-switched laser, and to direct the combined light into at least one output of the optical pulse combiner 6. The at least one output of the optical pulse combiner 6 is the output of the source 1. The output of the source 1 is optically coupled to a phase measurement element 3, and an output of the phase measurement element 3 is optically coupled to at least one photodetector 5. In a further embodiment, the phase measurement element 3 comprises a time delay interferometer. In one example, as shown in FIG. 2, the time delay interferometer is a Mach Zehnder interferometer (MZI) that comprises two arms, a reference arm and a long arm, the long arm comprising an interferometer delay 8, wherein light from the two arms are interfered with each other and directed to the output of the interferometer. In another example, which is not shown, the time delay interferometer is a Michelson interferometer (MI) that comprises two arms, a reference arm and a long arm, both arms terminated by mirrors and the long arm comprising an interferometer delay, wherein light reflected from the two mirrors is interfered with each other and directed to the output of the interferometer.

The source 1 is configured to inject a modulation current into each gain-switched laser such that each gain-switched laser outputs a stream of phase randomised pulses. The injection of a modulation current is described further below in relation to FIGS. 3(*a*) to 3(*c*). The source 1 is further configured such that each stream of pulses from each gain-switched laser is temporally offset by a different amount from a reference time, and wherein all the gain-switched lasers have the same repetition rate. A temporally offset stream of pulses is a stream of pulses that leads or lags another stream of pulses or a reference time point. In one embodiment, described further below in relation to FIG. 4(*a*), the source 1 is configured such that each gain-switched laser is optically coupled to a physical delay element such that the stream of pulses emitted by each gain switched laser is temporally offset relative to one other. The physical delay elements may be optical fibres of different lengths for example. In an alternative embodiment, described further below in relation to FIG. 4(*b*), the source 1 is configured such that the modulation currents applied to each gain-switched laser are temporally offset relative to one another, such that the stream of pulses emitted by each gain-switched laser is also temporally offset relative to one other. Each gain-switched laser is configured to emit pulses at substantially the same optical frequency and with substantially the same intensity. The gain-switched lasers emitting pulses at substantially the same frequency means that the optical spectra of the pulses from each gain-switched laser overlaps. Each temporally offset stream of pulses emitted by each gain-switched laser is directed into the optical pulse combiner 6 which is configured to combine the temporally offset streams of pulses into a combined stream of pulses 15. The combined stream of pulses 15 is referred to as the interleaved pulse stream 15. The interleaved pulse stream 15 is directed into the at least one output of the optical pulse combiner 6, which is the output of the source 1. The interleaved pulse stream is directed into the time delay interferometer 3, where the interleaved pulse stream is interfered with a delayed version of the interleaved pulse stream. The stream of interfered pulses is sent to a photodetector where the intensity of the interfered pulses is converted to a signal. The signal corresponding to the intensity of the stream of interfered pulse has a random value because the phases of the pulses in the stream of combined pulses from the source 1 are random.

Figure 3:
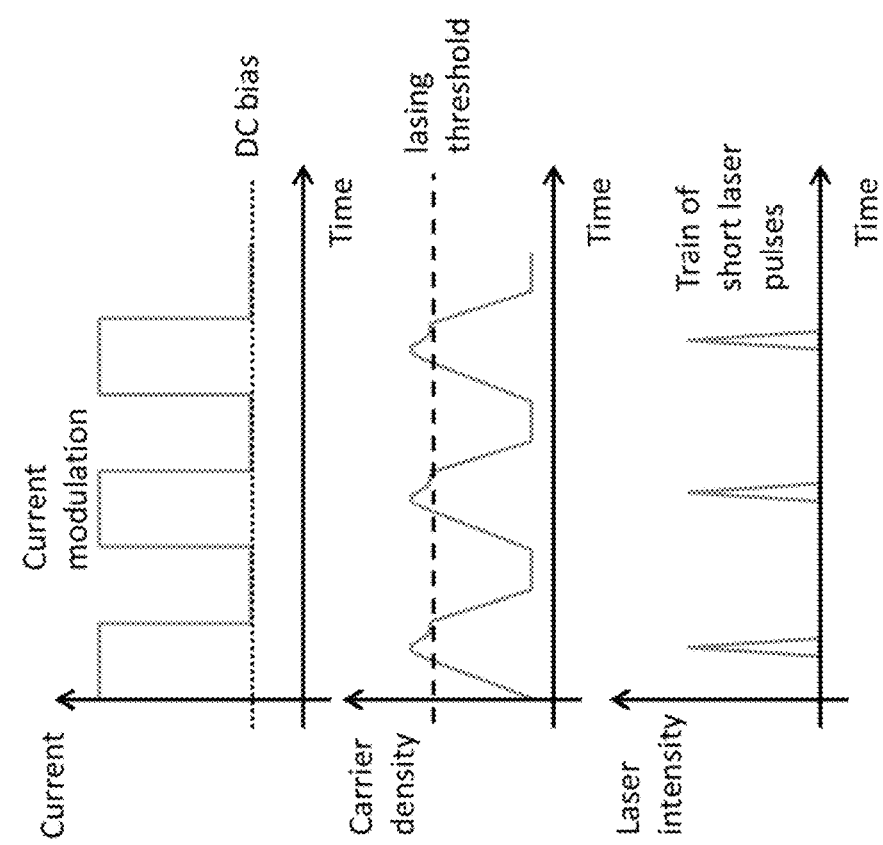
FIG. 3(a) is a schematic illustration of a gain switched laser.
FIG. 3(b) shows the driving current signal waveform (upper), the carrier density variation (middle) and the output laser intensity (lower) of a gain switched laser.
FIG. 3(c) is a schematic illustration of an electrical driving circuit for a semiconductor laser.
FIG. 3(d) is a schematic illustration of a gain-switched laser further comprising a seed laser and an output laser.
FIG. 3(e) shows the seed laser and the output integrated laterally on a substrate.
FIG. 3(f) is a schematic illustration of a gain-switched laser further comprising a laser and a pulse carver.
FIG. 3(g) shows the output of the laser optically coupled to the input of the pulse carver.
Figure 3:
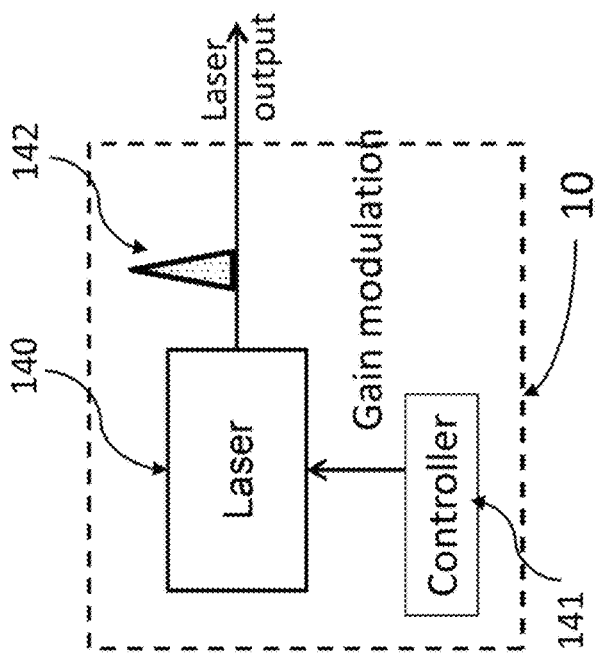
Figure 3:
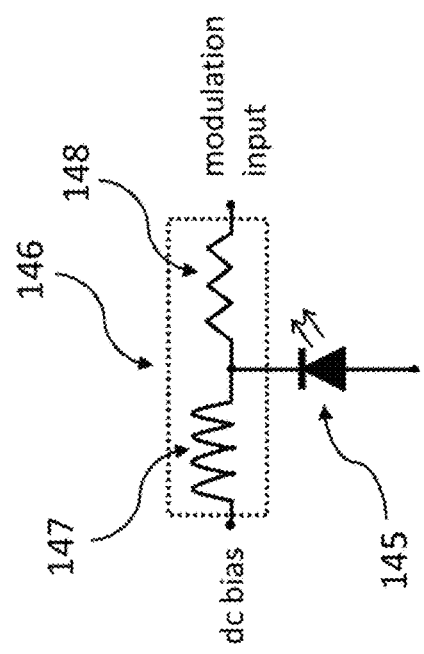

FIG. 3(*a*) shows a schematic illustration of a gain-switched semiconductor laser 140. A gain-switched laser generates light when the laser is switched above the lasing threshold and generates almost no light when the laser is switched below the lasing threshold. A controller 141 controls modulation of the gain of the laser by modification of the pump power, in a time varying manner. The laser is pumped electrically, by applying a current. In order to modulate the gain of a semiconductor laser, the controller 141 modulates the current applied to the laser.

Each gain-switched laser from the plurality of gain-switched lasers 10 from the source 1 may thus individually be periodically switched above and below the lasing threshold by application of a time varying current. In one example, a controller (not shown) may be connected to each of the gain-switched lasers 10 to modulate the gain of each laser, by applying a current through an electrical connection. In this manner, the lasers generate light pulses. The controller (not shown) comprises a driving circuit which applies a time varying current such that the lasers are switched periodically above the lasing threshold, generating light pulses. The current applied to the lasers has the form of a series of current modulation pulses. The lasers output light when the carrier density is above the lasing threshold. The pulses of light output by the lasers are temporally synchronised.

In another example, instead of a single controller, a plurality of controllers, each controller being connected to one of the gain switched lasers, may be used to modulate the gain of each laser, by applying a current through an electrical connection. Each controller comprises a driving circuit which applies a time varying current such to each laser such that each laser is switched periodically above the lasing threshold, generating light pulses. The current applied to each laser has the form of a series of current modulation pulses; the pulses in each current modulation may occur at the same time, or they may occur at different times. Each laser outputs light when its carrier density is above its lasing threshold. The lasers output light at independent times; the light may be output at the same time, or the light may be output at different times.

FIG. 3(*b*) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave is a square-type waveform. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases. The rapid increase of the photon density causes a decrease in the carrier density. This in turn decreases the photon density, which increases the carrier density. When the current modulation pulse switches back down to the DC bias level, and the laser emission dies off.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

FIG. 3(*c*) shows a schematic illustration of an electrical driving circuit for a semiconductor gain-switched laser diode 145. The cathode of laser diode 145 is connected to bias-T 146 comprising inductor 147 and resistor or capacitor 148. Via inductor 147 a DC bias current is sent through the laser diode. This provides the gain bias (the minimum level of the current indicated by the dotted line in FIG. 3(*b*)). Via resistor or capacitor 148 an AC modulation current is sent through the laser diode, providing the gain modulation needed for gain-switching the laser above and below the lasing threshold. In this case, the modulation input to the bias-T 146 is provided by controller 141. In an example, the time varying current has a square type wave form, with a frequency of 2 GHz. In an alternative embodiment, the time varying current is an electrical sine wave generated by a frequency synthesizer. The time varying current can comprise signals with arbitrary pulse shape.

The gain bias may be chosen to be closer to the lasing threshold as driving a gain-switched laser in this regime may reduce pulse jitter and frequency chirp of the output light. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. For QRNG, the interference of pulses is measured once the pulses have settled into the steady-state. The laser pulse ends when the current pulse ends and switches the current to the bias value again.

FIG. 3 (d) shows a schematic illustration of a gain-switched laser 10d for QRNG according to an example. It is desirable to have a gain-switched laser emitting a stream of pulses having a narrow pulse width. However, simply setting the AC modulated signal to have a narrow pulse width may result in variations in timing (jitter) from pulse to pulse. In the example shown in FIG. 3 (d), the gain-switched laser 10d comprises two lasers 145 and 140. Laser 145 is referred to as a seed laser while laser 140 is referred to as an output laser. Both seed laser 145 and output laser 140 may be gain-switched lasers driven by controller 151 and controller 141 respectively. Controller 151 injects an AC modulated current 152 at a rate R into the seed laser 145 to emit a stream of pulses at a repetition rate R, as described in relation to FIGS. 3(a) to 3(c). The repetition rate R is chosen to be low enough such that pulses from the stream of pulses 143 have a random phase. Pulses 143 may have a pulse width $w_{seed}$ and $w_{seed}$ is proportional to the width of the AC modulated current 152 pulses. The stream of pulses 143 are optically coupled into the output laser 140 such that the output laser 140 is seeded by the seed laser 145. Controller 141 is configured to inject an AC modulated current 156 into the output laser 140, the AC modulated current 156 having the same rate R but a narrower pulse width than the AC modulated current 152 applied to the seed laser. The modulated currents 152 and 156 applied by controllers 151 and 141 are temporally synchronised such that they are overlapping. Therefore, the output laser 140 is switched on above its threshold level once while it is being coherently seeded by the seed laser 145. The output laser 141 therefore emits a stream of pulses 142 at a rate R, and each pulse has a fixed phase relationship relative to the pulse from the seed laser 143. Since each pulse from the stream of pulses 143 from the seed laser has a random phase, each pulse from the stream of output pulses 142 also has a random phase. However, the pulse width of pulses from the stream of output pulses 142 is narrower than the pulses from the seed laser 143. Typically, the width of the output pulses 142 in laser 10d is approximately less than or equal to 40 ps.

FIG. 3 (e) shows a schematic illustration of the seed laser 145 and output laser 140 of FIG. 3 (d) according to an example. The seed laser 145 and the output laser 142 are integrated laterally on a substrate 200 in the plane parallel to the surface of the substrate. The integration of the seed and output lasers is described further below in relation to FIGS. 8 (e) and (f). In another example which is not shown, the seed laser 145 and the output laser 142 are integrated laterally on a substrate 200 in the plane parallel to the surface of the substrate, together with a variable optical attenuator (VOA), such that the light emitted by the seed laser 145 is directed into the VOA and light emitted by the VOA is directed into the output laser 140.

FIG. 3 (f) shows a schematic illustration of a gain-switched laser 10f for QRNG according to another example. It is desirable to have a gain-switched laser emitting a stream of pulses having a narrow pulse width. However, simply setting the AC modulated signal (the driving current) to have a narrow pulse width may result variation in timing (jitter) from pulse to pulse. FIG. 3 (f) shows an example where the gain-switched laser 10d comprises a gain switched laser 140, a controller 141 and a pulse carver 158. The pulse carver 158 is a high bandwidth intensity modulator that can be used to produce pulses of approximately 100 ps. The gain switched laser 140 generates a stream of pulses 143 as described in relation to FIGS. 3 (a) to (c). The stream of pulses is injected into the pulse carver 158. The pulse carver 158 is controlled by a controller 154. The controller 154 is configured to send a modulated control signal to the pulse carver 158 and the control signal is temporally synchronised with the AC modulation signal of the controller 141 and has the same repetition rate. The control signal applied to the pulse carver 158 determines whether the pulse carver 158 attenuates the injected light or whether it allows the injected light to pass through. The pulse carver 158 may therefore be configured to attenuate light during part of the time that a pulse 143 is injected and to let light pass through in the remaining time, thereby resulting in an output pulse 142 that has a narrower pulse width than the pulse 143 output by the gain-switched laser 140. Typically the width of the output pulses 142 in laser 10f is approximately less than or equal to 100 ps.

FIG. 3 (g) shows a schematic illustration the laser 140 and the pulse carver 158 of FIG. 3 (f). Laser 140 may be a semiconductor laser as described further in relation to FIG. 8 (a). Pulses 143 output by laser 140 are optically coupled to the pulse carver 158 using an optical interconnect (not shown). The optical interconnect may comprise an optical fibre for example.

Figure 4:
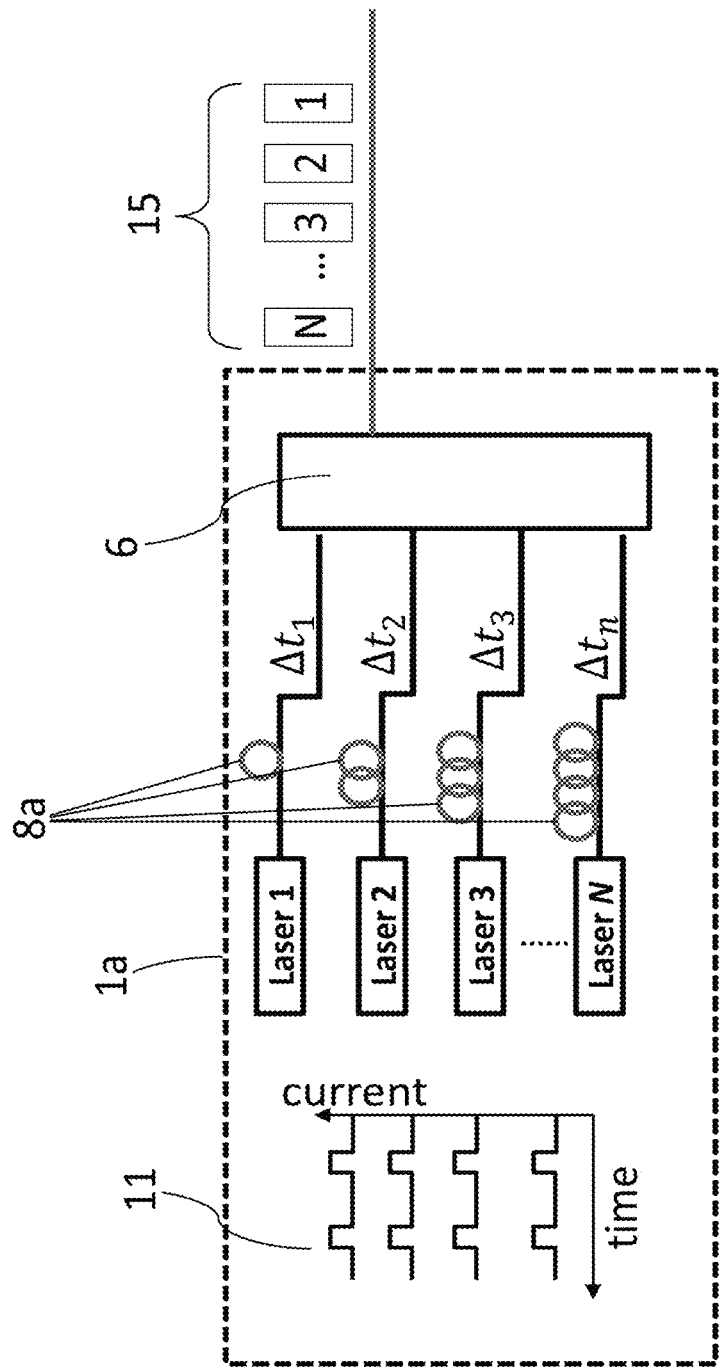
FIG. 4(a) is a schematic illustration of a source for a QRNG where a stream of pulses of light from each gain-switched laser is directed into a delay element.
FIG. 4(b) is a schematic illustration of a source for a QRNG where modulation currents are injected into each of the plurality of gain-switched lasers and the modulation currents are temporally offset relative to one another.
Figure 4:
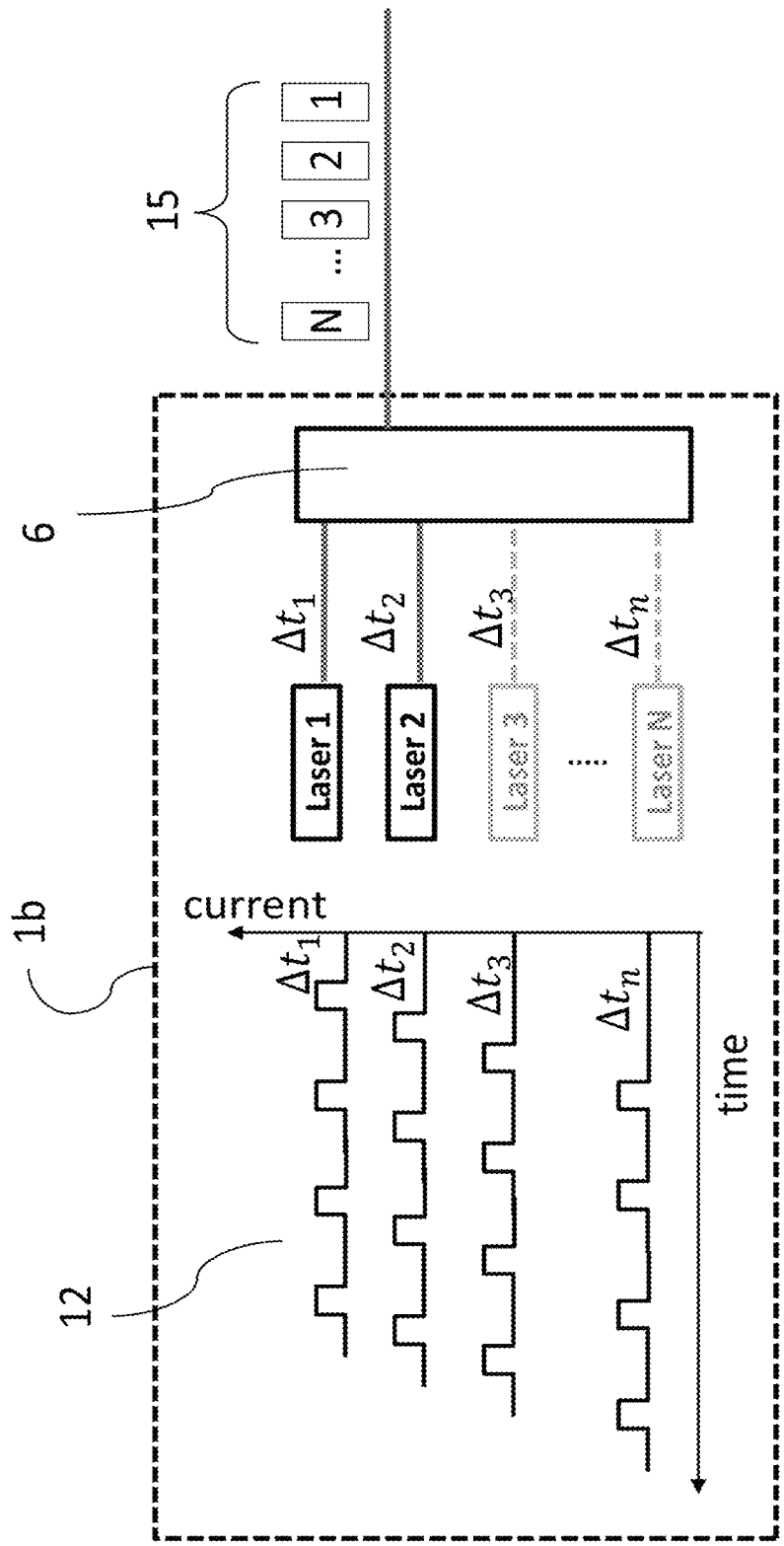

FIG. 4 (a) is a schematic illustration of a source 1a for a QRNG in accordance with an example. Modulation currents 11 are injected into each of the plurality of gain-switched lasers of the source 1a. The modulation current for each gain-switched laser may be provided by a controller and bias-T circuit 146 as described in relation to FIG. 3 (a) to (c)—in other words, there is provided one controller 141 and one bias-T circuit 146 for each gain-switched laser. Alternatively, the modulation currents for all gain-switched lasers may be provided a single controller (not shown). The modulation currents are temporally synchronised, that is, they overlap in time and have the same repetition rate. The streams of pulses output by the gain-switched lasers are also temporally synchronised, that is, they overlap in time and have the same repetition rate. The amplitude of the modulation current for each gain-switched laser is configured such that the gain-switched lasers emit pulses of the same intensity.

Each gain-switched laser is optically coupled to a different delay element 8a such that each stream of pulses output by each gain-switched laser is temporally offset by an amount $\Delta t1, \Delta t2, \Delta t3, \ldots$ and $\Delta tn$. The delay elements 8a may comprise optical fibres of different lengths, air gaps of different lengths, or waveguides of different optical path lengths for example. The temporally offset streams of pulses are directed into the optical pulse combiner 6 which is configured to combine the temporally offset streams of pulses into an interleaved pulse stream 15. The interleaved pulse stream is directed to the at least one output of the optical pulse combiner, which is also the output of the source 1a.

FIG. 4 (b) is a schematic illustration of a source 1b for a QRNG in accordance with another example. Modulation currents 12 are injected into each of the plurality of gain-switched lasers of the source 1b. The modulation current for each gain-switched laser may be provided by a controller and bias-T circuit 146 as described in relation to FIG. 3 (a) to (c)—in other words, there is provided one controller 141 and one bias-T circuit 146 for each gain-switched laser. The modulation currents injected into each gain-switched laser are temporally offset by an amount $\Delta t1, \Delta t2, \Delta t3, \ldots$ and $\Delta tn$ relative to a reference time instant such that the stream of pulses output by each gain-switched laser is also temporally offset by an amount $\Delta t1, \Delta t2, \Delta t3, \ldots$ and $\Delta tn$ relative to a reference time instant. The temporally offset streams of pulses are directed into the optical pulse combiner 6 which is configured to combine the temporally offset streams of pulses into an interleaved pulse stream 15. The interleaved pulse stream is directed to the at least one output of the optical pulse combiner, which is also the output of the source 1b.

According to one example, temporally offset modulation currents 12 can be generated using a multichannel arbitrary waveform generator (AWG) wherein each output channel of the AWG is electrically coupled to a transconductance amplifier. According to another example, temporally offset modulation currents 12 are generated using phase locked loop (PLL) circuits electrically coupled to amplifiers and the bias-T circuit 146 described in relation to FIG. 3, wherein each PLL circuit receives the same frequency reference signal for synchronisation purposes, and each PLL circuit is programmed to output a modulation signal at a frequency R and with a phase between 0 and $2\pi$. A phase of $2\pi$ corresponds to a delay of $1/R$. Referring to FIG. 4(b), for N gain-switched lasers and N modulation currents, the phases of the PLL circuits may be configured to differ from one another by $2\pi/N$ such that $\Delta t_2 - \Delta t_1 = \Delta t_3 - \Delta t_2 = \ldots = \Delta t_n - \Delta t_{n-1} = 1/(NR)$. The frequency R and the phase of the modulation signal generated by each PLL circuit can be controlled via a software interface or by inputting analogue voltages into the PLL chip for example. According to a further example, each PLL circuit receives the same frequency reference signal and is programmed to output a modulation signal at a frequency R and having the same phase. The modulation signals from each PLL circuit are passed through electronic delays, each having different delays and further coupled to amplifiers and bias-T circuits, to generate temporally offset modulation currents 12. According to an alternative example, a single PLL circuit is used to generate a modulation signal at a frequency R which is divided and directed into N paths using power splitters, each path having different electronic delays, and each path being further coupled to amplifiers and bias-T circuits, to generate temporally offset modulation currents 12. It will also be understood that PLL circuits programmed to output a modulation signal at a frequency R and with a phase between 0 and $2\pi$, can be combined with power splitters and electronic delays to generate temporally offset modulation currents 12.

In further embodiment which is not shown, a source 1 for a QRNG comprises delay elements 8a as described in relation to FIG. 4 (a) as well as temporally offset modulation currents 12 as described in relation to FIG. 4 (b). The delay elements 8a and the temporally offset modulation currents 12 are configured such that the stream of pulses output by each gain-switched laser is temporally offset by an amount $\Delta t1, \Delta t2, \Delta t3, \ldots$ and $\Delta tn$ relative to one another. The temporal offset of each stream of pulses is achieved using a combination of delay element 8a—a physical delay- and a temporally offset modulation current 12—an electronic offset.

FIG. 5 (a) is a schematic illustration of a QRNG in accordance with an embodiment. The source 1 comprises two gain-switched lasers each configured to output a stream of randomised pulses having the same optical wavelengths and intensity. The pulses 13 from both gain-switched lasers are generated at the same repetition rate R, where R is less than or equal to the maximum repetition rate at which each gain-switched laser can be driven such that the phase of the pulses is random. In one embodiment, R is approximately 2 GHz. In another embodiment, R is approximately 5 GHz. The temporal spacing between consecutive pulses emitted by each gain-switched laser is $1/R$. The source 1 is configured such that the stream of pulses output by each gain-switched laser is temporally offset such that the stream of pulses from the first gain-switched laser does not temporally overlap with the stream of pulses from the second gain-switched laser. For example, when R is 5 GHz, the separation between pulses is 200 ps, and the widths of the pulses must be <100 ps. The source 1 may be implemented as described in relation to FIG. 4 (a) or FIG. 4 (b). The streams of pulses from the source 1 are directed to the optical pulse combiner 6 which is configured to combine the streams of pulses from the source 1. The optical pulse combiner is described further below in relation to FIGS. 6 (a) and 6 (b). The combined stream of pulses 15, also referred to as the interleaved pulse stream 15, is optically coupled to the input of the time delay interferometer 3. The delay element 8 is configured such that the time delay D is equal to $1/R$. With $D=1/R$, a pulse originating from the first gain-switched laser for example interferes with a preceding pulse originating from the same laser. Similarly, a pulse originating from the second gain-switched laser interferes with a preceding pulse originating from the same laser. The signal corresponding to the intensity of the interfered pulse has a random value because the phases of pulses emitted by the gain-switched laser are random.

FIG. 5 (b) is a schematic illustration of a QRNG in accordance with another embodiment. The source 1 comprises two gain-switched lasers each configured to output a stream of randomised pulses having the same optical wavelengths and intensity. The pulses from both gain-switched lasers are generated at the same repetition rate R, where R is less than or equal to the maximum repetition rate at which each gain-switched laser can be driven such that the phase of the pulses is random. In one embodiment, R is approximately 2 GHz. In another embodiment, R is approximately 5 GHz. The temporal spacing between consecutive pulses emitted by each gain-switched laser is $1/R$. The source 1 is configured such that the stream of pulses output by each gain-switched laser is temporally offset such that the stream of pulses from the first gain-switched laser does not temporally overlap with the stream of pulses from the second gain-switched laser. In particular, the pulses emitted by the second gain-switched laser are temporally offset by an amount $\Delta t$ equal to the reciprocal of twice the repetition rate, that is, $\Delta t = 1/(2R)$. For example, when R is 5 GHz, the separation between pulses in one stream is 200 ps, and the widths of the pulses must be <100 ps. The offset $\Delta t = 100$ ps. The source 1 may be implemented as described in relation to FIG. 4 (a) or FIG. 4 (b). The streams of pulses from the source 1 are directed to the optical pulse combiner 6 which is configured to combine the streams of pulses from the source 1. The optical pulse combiner is described further below in relation to FIGS. 6 (*a*) and 6 (*b*). The interleaved pulse stream 15 is optically coupled to the input of the time delay interferometer 3. The delay element 8 is configured such that the time delay D is equal to $\Delta t=1/(2R)$. With $D=\Delta t$, a pulse originating from the first gain-switched laser for example interferes with a preceding pulse originating from the second gain-switched laser. The signal corresponding to the intensity of the interfered pulse has a random value because the phases of pulses from different gain-switched laser are random. The temporal separation between pulses in the interleaved pulse stream 15 is $\Delta t=1/(2R)$, while the temporal separation between pulses generated by each individual laser is 1/R. The temporal separation between each interfered pulse is $\Delta t=1/(2R)$. The rate at which pulses interfere is 2R. Therefore, when R=5 GHz, each of the two individual gain-switched lasers emit at a rate of 5 GHz but the pulse interference rate is 10 GHz.

FIG. 5 (*c*) is a schematic illustration of a QRNG in accordance with yet another embodiment. The source 1 comprises N gain-switched lasers each configured to output a stream of randomised pulses having the same optical wavelengths and intensity. The pulses from the N gain-switched lasers are generated at the same repetition rate R, where R is less than or equal to the maximum repetition rate at which each gain-switched laser can be driven such that the phase of the pulses is random. The temporal spacing between consecutive pulses emitted by each gain-switched laser is 1/R. The source 1 is configured such that the stream of pulses output by each gain-switched laser is temporally offset such that the stream of pulses output by any one gain-switched laser does not temporally overlap with the stream of pulses from another gain-switched laser. In particular, the pulses emitted by gain-switched lasers are temporally offset from one another by an amount $\Delta t$ equal to the reciprocal of N times the repetition rate, that is, $\Delta t=1/(NR)$. For example, when R is 5 GHz, the separation between pulses in one stream is 200 ps, and the widths of the pulses must be <100 ps. The offset $\Delta t=200/N$ ps. The source 1 may be implemented as described in relation to FIG. 4 (*a*) or FIG. 4 (*b*). The streams of pulses from the source 1 are directed to the optical pulse combiner 6 which is configured to combine the streams of pulses from the source 1. The optical pulse combiner is described further below in relation to FIGS. 6 (*a*) and 6 (*b*). The interleaved pulse stream 15 is optically coupled to the input of the time delay interferometer 3. The delay element 8 is configured such that the time delay D is equal to an integer multiple of the reciprocal of the number of lasers times the repetition rate of each laser; that is, $D=m\times\Delta t$, where $\Delta t=1/(N\times R)$ and m is an integer and $m\geq 1$. With $D=m\times\Delta t$, a pulse originating from the first gain-switched laser for example interferes with a preceding pulse originating from any other gain-switched laser, including the same first gain-switched laser. The signal corresponding to the intensity of the interfered pulse has a random value because the phases of pulses are random. The temporal separation between pulses in the interleaved pulse stream 15 is $\Delta t=1/(N\times R)$, while the temporal separation between pulses generated by each individual laser is 1/R. The temporal separation between each interfered pulse is $\Delta t=1/(N\times R)$. The rate at which pulses interfere is N×R. Therefore, when R=5 GHz, each of the individual gain-switched lasers emit at a rate of 5 GHz but the pulse interference rate is N×5 GHz.

In the examples of FIGS. 5 (*a*), (*b*) and (*c*), the stream of interfered pulses is sent to photodetector 5 where the intensity of the interfered pulses is converted to a signal. In the example of FIG. 5 (*b*), the photodetector is configured to detect the intensity of pulses at the rate of at least 2R=10 GHz. In the example of FIG. 5 (*c*), the photodetector is configured to detect the intensity of pulses at the rate of at least N×R. Suitable photodetectors may include InP based on-chip photodetectors that have bandwidths in excess of 20 GHz.

Figure 6:
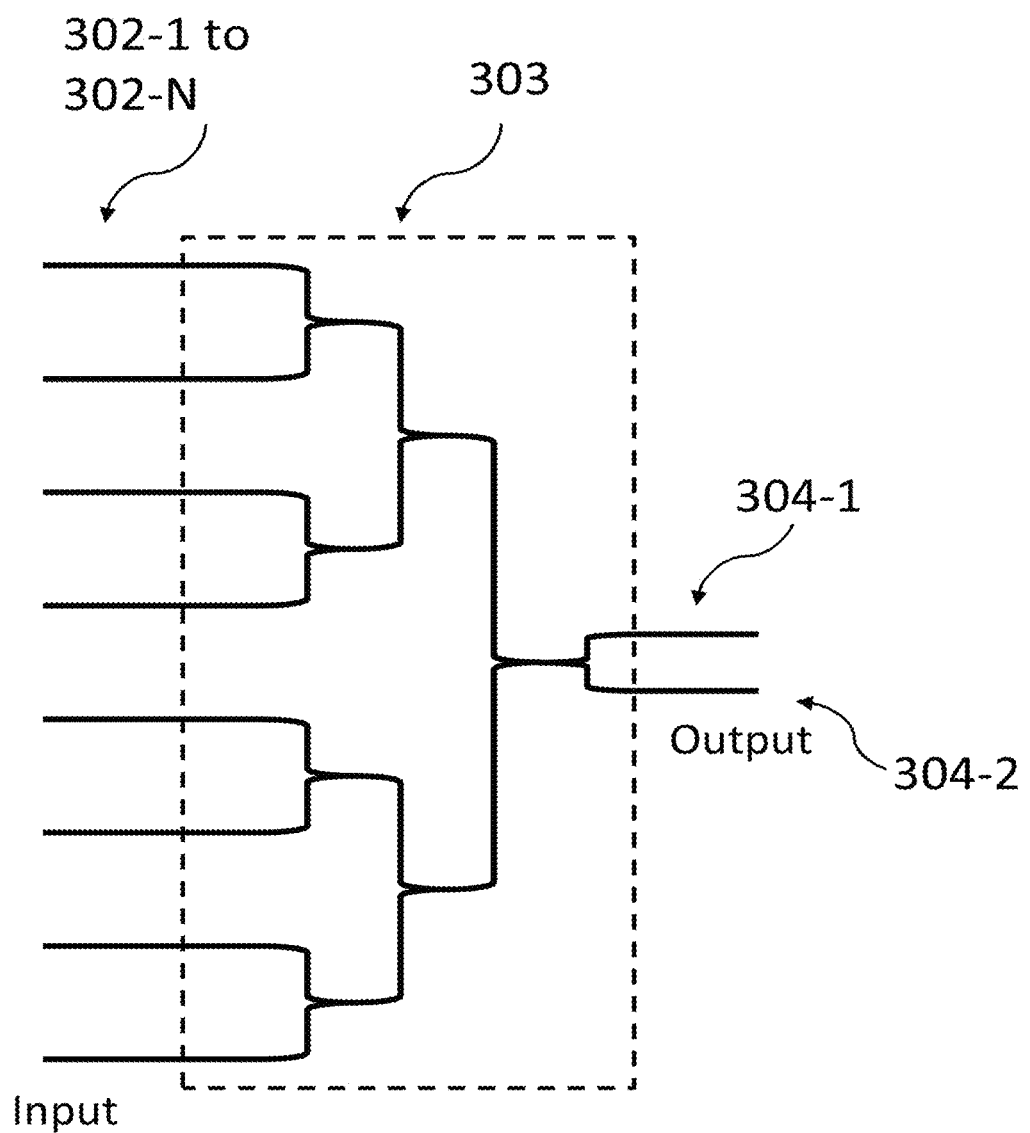
FIG. 6(a) is a schematic illustration of an 8×2 coupler.
FIG. 6(b) is a schematic illustration of a multimode interference coupler.

FIG. 6(*a*) shows a schematic illustration of a passive optical combiner 303. In an embodiment, the optical pulse combiner 6 comprises the passive optical combiner 303.

At the input, the optical pulse combiner 6 comprises N inputs where $N\geq 2$, and at the output, the optical pulse combiner 6 comprises at least one output.

Light may be provided to the N inputs by, for example, single mode fibres 302-1 to 302-N, and light may be collected from the outputs by fibres 304-1 or 304-2, where fibres 304-1 or 304-2 are single mode fibres or multi-mode fibres. Other means of delivering and collecting light such as ridge waveguides on a substrate may also be used.

Input 302-1 is connected to a first input of a 2×1 passive optical coupler inside the N×2 passive optical combiner, while input 302-2 is connected to the second input of the a 2×1 passive optical coupler. The 2×1 passive optical coupler combines the optical pulses from inputs 302-1 and 302-2. Similarly, the optical pulses from inputs 302-3 and 302-4, or 302-5 and 302-6, and so on are combined in other 2×1 passive splitters inside the N×2 passive optical splitter. The outputs of pairs of 2×1 passive splitters are connected to further 2×1 to further combine the input pulses. By cascading several 2×1 passive optical couplers together, the N inputs may be combined into N/2 signals after a first stage of the cascade, into N/4 signals after a second stage of the cascade, and so on until the penultimate stage of the cascade where the N input signals has been combined into two signals. In one example, as shown in FIG. 6 (*a*), the final coupler in the cascade comprises a 2×2 passive optical coupler, which combines the two signals from the penultimate stage of the cascade and outputs it into two output channels 304-1 and 304-2. With the above arrangement, a N×2 passive optical combiner is obtained. In another example, which is not shown, the final coupler in the cascade comprises a 2×1 passive optical coupler which combines the two signals from the penultimate stage of the cascade and outputs it into one output channel, such that a N×1 passive optical combiner is obtained.

In the example shown in FIG. 6 (*a*), N=8. It will be understood that other values of N can also be used. It will also be understood that the configuration shown in FIG. 6 (*a*) is an example and other arrangements can also be used.

With N=8, each input signal 302-1 to 302-N is passed through two 2×1 passive optical coupler and one 2×2 passive optical coupler before being output at 304-1 and 304-2.

The passive optical combiner 303 may be a N×M passive optical combiner, where $M\geq 1$ and $N\geq 2$. In one embodiment, the passive optical combiner 303 uses evanescent coupling to couple light from one waveguide into one or several other waveguides. In one embodiment, the passive optical combiner 303 comprises two or more optical fibres, wherein the cladding thickness of the optical fibres is reduced, and two or more fibres are arranged in close contact. In the contact region, light is evanescently coupled from one fibre into the other fibres in an oscillatory manner, i.e. the length of the coupling region determines how much light is coupled from one fibre into the other fibres. In other words, the length of the coupling region determines the splitting ratio. The length of the coupling region can be such that, for example, 50% of the light is coupled from one waveguide to the other. In one embodiment, the passive optical combiner 303 is implemented on a photonic chip. Several waveguides on the photonic chip are arranged in close contact to each other, such that in the contact region, light is evanescently coupled from one waveguide into the other waveguides.

In an alternative embodiment, the passive optical combiner 303 is an optical cross coupler, in which two waveguides are crossed in order to couple light from one waveguide to another.

In an embodiment, the passive optical combiner comprises a plurality of 2×1 passive optical couplers and/or 2×2 passive optical couplers connected together in a cascading fashion.

Alternatively, the passive optical splitter may comprise a single passive optical coupler having N input waveguides and M output waveguides arranged in close contact, such that light is coupled from the N waveguides into the M waveguides.

In a further embodiment, the waveguides and/or optical fibres are configured such that pulses provided at any of the N inputs 302-1 to 302-N of the passive optical combiner 303 travel the same distance before reaching the output. In other words, the optical path length (OPL) from any input to any output is the same. Therefore, pulses provided at the input are delayed by the same amount as they reach the output. In another embodiment, the OPL from the inputs to the outputs are different for each input. In this case, the pulses provided at different inputs would be delayed by different amounts as they reach the output. To enable a combination of pulses at the output such that pulses from different inputs are non-overlapping, the differences in OPL from each input to the outputs may be determined and the temporal offsets $\Delta t_1$, $\Delta t_2$, $\Delta t_3$ ... $\Delta t_n$ of the current modulation signals 12 applied to the plurality of gain-switched lasers 10 may be adjusted to compensate for the unequal OPL. In another example, the output of the passive optical combiner 303 is monitored to determine the temporal offsets applied to each modulation current.

FIG. 6 (*b*) is a schematic illustration of a passive optical combiner 331 which is a multi-mode interference (MMI) coupler. In an embodiment, the optical pulse combiner 6 comprises a MMI coupler. The MMI coupler may be an N×M MMI, where N≥2 and M≥1.

The MMI coupler comprises N input single-mode waveguides 334, in this case N=4, a multi-mode section 333 in which interference of multiple modes leads to generation of self-images and M output single-mode waveguides 332.

The coupler may be realised with waveguides on a chip fabricated with a suitable method, for example etching or direct writing with an intense laser beam. However, other realisations are possible. The MMI coupler 331 may be, for example, silicon, and comprise silicon-on-insulator waveguides.

A MMI coupler comprises single-mode inputs/outputs, and uses a different method to split the signals than the passive optical combiner shown in FIG. 6(*a*), which uses evanescent coupling.

In a MMI coupler 331, light is inserted from a single-mode waveguide into a multi-mode waveguide region 333. Interference between several modes excited in the multi-mode waveguide region 333 leads to the generation of self-images of the input light distribution for certain propagation distances in the multi-mode waveguide. The output single-mode waveguides are positioned at a suitable distance to the input waveguides to couple light from the input with a certain intensity distribution into the output waveguides. For example, a 2×2 coupler is designed such that the length of multi-mode waveguide generates two self-images each with 50% of the each of the input light pulses. At the position where these self-images are generated, the output single-mode waveguides are placed. Because it is an image of the input intensity distribution, the light is coupled efficiently into the output waveguides, 50% in each output.

In one embodiment, the MMI coupler is a N×2 splitter. In one embodiment, optical signals inserted into a first input waveguide 334-1 are distributed with a fixed ratio into the two outputs. The signal is split two-fold, with half of the optical signal inserted into the first input waveguide 334-1 distributed into each output waveguide 332. Optical signals inserted into a second input waveguide 334-2 are also distributed with a fixed ratio into the two outputs.

Optical signals inserted into a first output waveguide 332-1 are distributed with a fixed ratio into each of the two inputs. The signal is split N-fold, with a fraction 1/N of the optical signal inserted into the first output 332-1 distributed into each of the N inputs.

Figure 7:
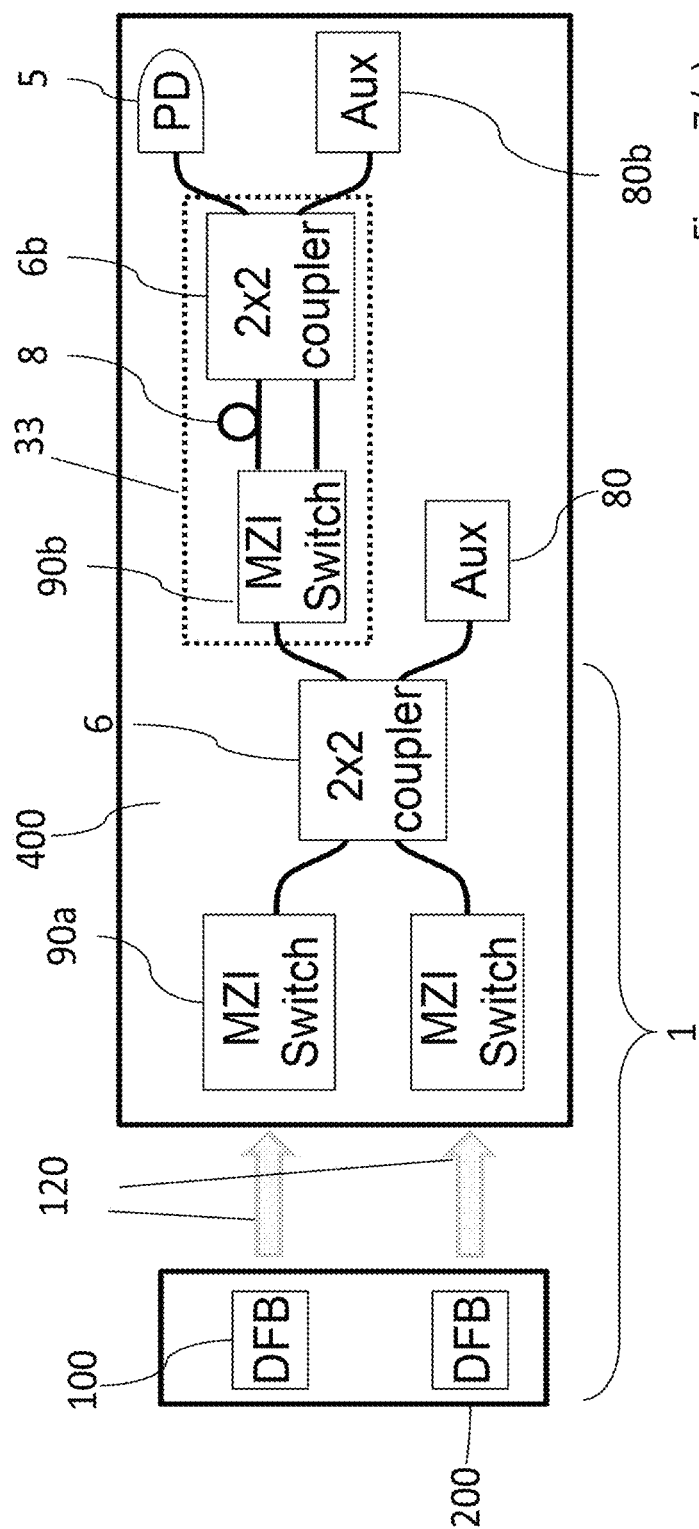
FIG. 7(a) shows a schematic illustration of a photonic integrated circuit (PIC) for a QRNG according to an embodiment, wherein the source of phase randomised pulses of light, the first optical element, the phase measurement element, and the optical detector are integrated on a first substrate.
FIG. 7(b) shows a side view of the device of FIG. 7(a).
FIG. 7(c) shows a schematic illustration of an optical device for a QRNG according to another embodiment, wherein the source of phase randomised pulses of light is disposed on a first substrate; the first optical element, the phase measurement element, and the optical detector are integrated on a second substrate; and each output of the plurality of outputs of the source of phase randomised pulses of light is optically coupled to each input of the plurality of inputs of the first optical element via an optical interconnect.
FIG. 7(d) shows a side view of the device of FIG. 7(c).
Figure 7:
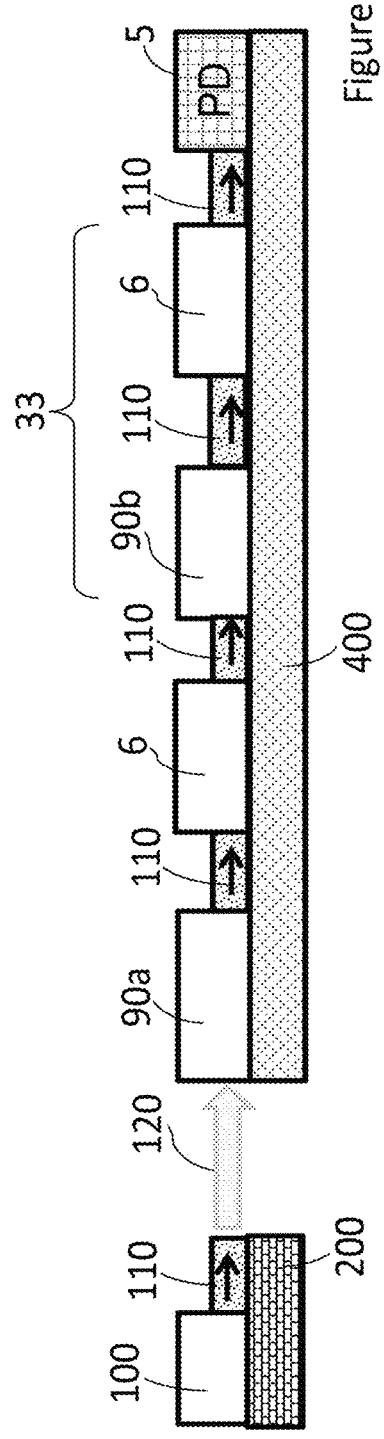

FIGS. 7 (*a*) and (*b*) show a schematic illustration of a photonic integrated circuit (PIC) for a QRNG according to an embodiment. FIG. 7 (*a*) shows a plan view while FIG. 7 (*b*) shows a side view. In this embodiment, the source 1 comprising the gain-switched lasers 100 and the optical pulse combiner 6, the time delay interferometer 33, and the photodetector 5 are integrated on a photonic chip based on an InP standard integration process and disposed on a single substrate 200. The different components are optically coupled to one another by means of light guiding sections 110. In this embodiment, the gain-switched lasers 100 are distributed feedback (DFB) lasers 100; however, it will be understood that other lasers such as distributed Bragg grating (DBR) or ridge lasers could also be used. The DFB lasers will be described in more detail below in relation to FIG. 8 (*a*). The DFB lasers are optically coupled to MZI switches 90*a* via light guiding sections 110. The MZI switch 90*a* is described further below in relation to FIG. 10. The MZI switches 90*a* act as variable optical attenuators (VOAs) and are configured to tune the intensities of the pulses output by the DFB lasers 100 such that the intensities of the pulses injected into each input of the optical phase combiner 6 are substantially equal. In the device of FIG. 7(*a*), the optical pulse combiner 6, described further above in relation to FIGS. 6 (*a*) and 6 (*b*), is a 2×2 directional coupler and combines the input pulses from the two DFB lasers 100 via the MZI switches 90*a* and outputs the combined pulses into a delay line interferometer 33 and an auxiliary component 80. The combined input pulse may be divided in a 50:50 ratio for example. The auxiliary component 80 is a further optical component such as: an optical interconnect, a grating coupler, or a photodiode etc. . . . . The auxiliary component 80 may be used for calibration purposes, for example, it may be used to determine the amount of attenuation in the MZI switches 90*a*. According to an alternative example which is not shown, the optical pulse combiner is a 2×1 coupler that combines the input pulses from the two DFB lasers 100 via the MZI switches 90*a* and outputs the combined pulses into a delay line interferometer 33. The delay line interferometer 33 is a MZI that further comprises a MZI switch 90*b*, a reference arm, a long arm with a delay element 8, and a 2×2 output coupler 6*b*. According to another example which is not shown, the output coupler 6*b* is a 2×1 coupler. The MZI switch 90*b* serves to compensate for the unequal losses in the reference and long arms. According to another example, which is not shown, the delay line interferometer is a Michelson interferometer (MI) that further comprises a 2×2 coupler, a reference arm and a long arm, both arms coupled to mirrors and the long arm comprising an interferometer delay element, wherein light reflected from the two mirrors is interfered with each other at the 2×2 coupler and directed to the output of the interferometer. For example the delay element 8 is typically a few centimeters long to obtain a delay D=500 ps and thus the losses accumulated in the long arm compared to the reference arm are different. To ensure that the reference pulse and the delayed pulse entering the output coupler 6b have substantially the same intensity, the MZI switch can be configured such that more power is injected into long arm of the interferometer, and less power is injected into the reference arm of the interferometer. The reference and delayed pulses interfere at the 2×2 coupler 6b and are directed towards a photodetector 5 and another auxiliary component 80b. The outputs of the 2×2 coupler 6b may be divided into a 50:50 ratio for example. The photodetector may be an InP based photodetector.

Each gain-switched DFB laser 100 is electrically coupled to a controller (not shown) as described in relation to FIG. 3 (*a*) to (*c*). The modulation currents 12 injected into the DFB lasers 100 are configured such that an interleaved pulse stream 15 is obtained as described in relation to FIGS. 4(*b*) and 5 (*b*).

FIGS. 7 (*c*) and (*d*) show a schematic illustration of a photonic integrated circuit (PIC) for a QRNG according to another embodiment. FIG. 7(*c*) shows a plan view while FIG. 7 (*d*) shows a side view. The difference of this embodiment from the embodiment shown in FIGS. 7 (*a*) and (*b*) is that the source 1 comprising the gain-switched lasers 100, is disposed on a first substrate 200. The optical pulse combiner 6, a time delay interferometer 33, and the photodetector 5 are disposed on a second substrate 400. The second substrate 400 is a Si based substrate for example and the optical pulse combiner 6, a time delay interferometer 33, and the photodetector 5 are integrated using a CMOS compatible process for example. The different components on the second substrate are optically coupled to one another by means of light guiding sections 110. The gain-switched lasers 100 disposed on the first substrate 200 are optically coupled to the MZI switch 90a via optical interconnects 120. The optical interconnect 120 connects a light guiding region on a first semiconductor substrate 200 to a light guiding region or to a MZI switch 90 a on the second semiconductor substrate 400, and may comprise an optical fibre for example. The optical interconnect may further comprise a pulse carver (not shown), as described in relation to FIGS. 3 (*f*) and (*g*), the pulse carver being configured to take pulses from the gain-switched lasers 100 as input and output narrower pulses into the MZI switches 90a. In an alternative example, the optical interconnect 120 further comprises delay elements (not shown) that apply different temporal offsets to the streams of pulses emitted by each gain-switched laser, as described in relation to FIG. 4 (*a*).

The first substrate may be InP based and, the gain-switched lasers 100 may be distributed feedback (DFB) lasers 100; however, it will be understood that other lasers such as distributed Bragg grating (DBR) or ridge lasers could also be used. The DFB lasers on an InP substrate are described in more detail below in relation to FIG. 8 (*a*).

The components on the second substrate 400 correspond to components shown in FIGS. 7(*a*) and (*b*). When the second substrate is Si based, the delay line interferometer 33 will have lower insertion losses than the delay line interferometer 33 on an InP substrate as shown in FIG. 7 (*a*) and (*b*). In particular, the delay element 8 is typically a few cm long (e.g. about 4.5 cm long for delays of 500 ps on InP, and 8 cm for delays of 500 ps on silicon nitride based substrate).

The propagation loss can be of 2 dB/cm on InP and 0.5 dB/cm on Si3N4, resulting in an insertion loss of 10 dB on InP and 4 dB on Si3N4. The photodetector may comprise Ge grown on Si using a CMOS compatible fabrication process. Ge-on-Si photodetectors have bandwidths exceeding 20 GHz for example.

In another embodiment which is not shown, the light emitted by the delay line interferometer 33 on the second substrate 400 is optically coupled to an InP-based photodetector disposed on a third substrate via an optical interconnect, the optical interconnect comprising an optical fibre for example.

Each of the gain-switched lasers from the plurality of gain-switched lasers in the source of phase randomised pulses of light 1 may be implemented as a distributed feedback (DFB) lasers, distributed Bragg reflector (DBR) lasers, or ridge lasers.

The gain-switched lasers may comprise a grating region. The grating region may be separate from the active region or the active region may comprise the grating. A laser where the active region and grating are separate is referred to as DBR (distributed Bragg reflector) laser (not shown). A laser where the active region comprises the grating is a DFB laser.

Ridge lasers (not shown) are also referred to as stripe lasers. A Fabry-Perot laser is a type of ridge or stripe laser. The terms stripe and ridge refer to the form of the laser waveguide. Fabry Perot refers to the form of the laser cavity i.e. two parallel mirrors made up by the end faces of the waveguide. Ridge lasers comprise waveguides with well-defined facets. The material structure comprises a core surrounded by cladding material. The cladding material may be lattice matched to an InP substrate. In one example, the cladding material is InP and the core is AlInGaAs. AlInGaAs may be used because it has a higher refractive index compared to InP.

FIG. 8 (*a*) shows a DFB laser suitable for use as a gain-switched laser in a QRNG. Although FIGS. 8 (*a*) to (*d*) and the description below describe a DFB laser, it will be understood that a DBR (not shown) or a ridge laser (not shown) could alternatively be used in a QRNG.

The active area in the DFB laser of FIG. 8 (*a*) cases comprises a multi quantum well region (MQW). The MQW region comprises a plurality of quantum well layers. Where the laser is configured for 1.55 um operation, the MQW region comprises alternating layers of materials such as, for example: AlInGaAs/InP, AlInGaAs/AlInAs, InGaAsP/InP, InGaAsP/AlInAs or InGaAs/AlInGaAs. All these layers are lattice matched to an InP substrate.

The device comprises a substrate 200. On one surface of the substrate is an n-contact 226. Overlying and in contact with the opposite surface to the substrate 200 is the buffer layer 206. Both the substrate 200 and the buffer layer 206 are n-type layers. Alternatively, the structure can be reversed, such that the substrate 200 is a p-type layer. The layers may be n-doped InP. Overlying and in contact with the buffer layer 206 is the n-type layer 208. The n-type layer 208 may be n-doped InP. Overlying and in contact with a strip of the n-type layer 208 is a first waveguide material 210a. Overlying and in contact with the first waveguide material 210a is a MQW layer 212. Overlying and in contact with the MQW layer 210 is a second waveguide material 210b. On either side of the strip and overlying and in contact with the n-type material 208 is a p-type material 216, which may be p-doped InP. The n-type layer 218 is overlying and in contact with the p-type layer 216, and may be n-doped InP. The p-type layer 220 is overlying and in contact with the second waveguide layer 210b and the n-type layer 218, and may be p-doped InP. A p-type contact layer 222 is overlying and in contact with the p-type layer 220. In one embodiment, the p-type contact layer 222 is heavily doped InP, i.e. having a dopant concentration higher than that of layer 220. A p-contact metal 224 is overlying and in contact with part of the p-contact layer 222. A schematic of the device cross section is shown in FIG. 8 (b).

As shown in the side view in FIG. 8 (a), the MQW strip runs along the length of the device. There is a first p-type contact layer 224 over part of the MQW strip. On either side of the part of the strip under the first p-contact 224 along the direction in which light is emitted, there is a diffraction grating in the second waveguide material.

A current is applied between the first p-contact 224 and the n-contact 226 in order to generate light in the MQW strip of the laser. Light generated in the MQW strip of the laser is emitted along the MQW layer. The light is laterally confined by the p-type layer 216 and vertically confined by the waveguide layers 210a and b. The light exits the MQW layer through an aperture of the laser; the apertures are described below.

FIG. 8(a) shows the grating of the DFB that is along the entire structure on the surface of the waveguide region 210b. The DFB lasers do not have discrete mirrors, instead the grating provides optical feedback distributed over the active region and the light is reflected by the grating. This is different from DBR lasers in which discrete mirrors are formed by gratings at the ends of the laser, and the active regions and gratings are separate.

Where multiple different devices, such as a DFB laser 100 and a waveguiding section 110 as shown in FIG. 8(c), are monolithically grown, a physical gap 270 may be created between them, which may be achieved by etching trenches for example. This gap can be filled with a material with a similar index of refraction, after the trenches are etched, or the gap may be left empty (i.e. filed with air).

FIG. 8(c) shows a side view along the length of the device, i.e., along the direction along which light is emitted. Light from the DFB laser 100 is emitted towards a light guiding regions 110. There is a gap between the DFB 100 and the light guiding region 110. The gap may extend across the entire device in the direction perpendicular to the direction in which light is emitted. The gap extends down to the buffer layer 206. Light travels between the DFB laser 100 and the light guiding region 110 though free space 270 or through the material filled in the gap 270.

FIG. 8(d) also shows a cross-section through a direction perpendicular to the direction along which light is emitted are shown. Since multiple lasers may be located alongside each other in a direction perpendicular to the direction along which light is emitted, as shown in FIG. 4(b) or 7(a) for example, gaps 271 may also be included to separate the lasers in this direction. In another example, the gaps may be filled using, for example si-InP during the level OA growth step shown in FIG. 9(a).

The light guiding regions 110 comprise a first layer 280 overlying and in contact with the buffer layer 206, a waveguide region overlying and in contact with the first layer 280 and a second layer 282 overlying and in contact with the waveguide region. Light is confined vertically and laterally in the waveguide region. The first layer 280 and second layer 282 may be InP for example. The waveguide region may comprise an InGaAs layer with InAlAs cladding regions.

FIG. 8(e) shows a side view of a laser 100 comprising a seed laser 145 and an output laser 140. This configuration of laser 100 is suitable for outputting narrow pulses as described in relation to FIG. 3(d). In the example of FIG. 8(e), both the seed laser 145 and the output laser 140 are DFB lasers. It will be understood that DBR or ridge lasers could also be used. It will also be understood that the lasers may be of different types, for example, the seed laser 145 may be a DBR laser, while the output laser 140 may be a DFB or ridge laser.

FIG. 8(e) shows a side view along the length of the device, i.e., along the direction along which light is emitted. There are light guiding regions 221a between the seed laser 145 and the output laser 140. There is a gap 270 between the seed laser 145 and the light guiding region 221a, and a gap 270 between the light guiding region 221a and the output laser 140. The gaps may extend across the entire device in the direction perpendicular to the direction in which light is emitted. The gaps extend down to the buffer layer 206. Light travels between the seed laser 145 and the output laser 140 though free space in the gaps and the light guiding region 221a. In another example, the gaps 270 may be filled using for example Si—InP during the level OA growth step shown in FIG. 9(a).

FIG. 8(f) shows a side view of a laser 100 comprising a seed laser 145 and an output laser 140 according to another example. This configuration of laser 100 is suitable for outputting narrow pulses as described in relation to FIG. 3(d). In the example of FIG. 8(f), both the seed laser 145 and the output laser 140 are DFB lasers. It will be understood that DBR or ridge lasers could also be used. It will also be understood that the lasers may be of different types, for example, the seed laser 145 may be a DBR laser, while the output laser 140 may be a DFB or ridge laser. FIG. 8(f) shows a side along the length of the device, i.e., along the direction along which light is emitted. Light output by the seed laser 145 is coupled into the output laser 140; that is, there is no light guiding region in between in contrast with the example of FIG. 8(e). There is a gap 270 between the seed laser 145 and the output laser 140. The gap may extend across the entire device in the direction perpendicular to the direction in which light is emitted. The gap extends down to the buffer layer 206. In another example, the gaps 270 may be filled using for example Si—InP during the level OA growth step shown in FIG. 9(a).

In another example which is not shown, a VOA is disposed between the seed laser 145 and the output laser 140. The VOA is integrated laterally on a substrate 200 in the plane parallel to the surface of the substrate, together with a seed laser 145 and the output laser 140, such that the light emitted by the seed laser 145 is directed into the VOA and light transmitted by the VOA is directed into the output laser 140. The VOA may comprise a MZI switch as described further below in relation to FIG. 10.

FIG. 9(a) shows a flow chart of a method of growth and fabrication of monolithically integrated DFB laser 100 using a lateral junction. The method can be used to fabricate a DFB laser 100 coupled to a light guiding region 110 as shown in FIG. 8(c) or a DFB laser comprising a seed and output laser as described in relation to FIG. 8(e) and FIG. 3(e). The method may also be used to fabricate a plurality of DFB lasers such as described in relation to FIG. 8(e), FIG. 7(a) or FIG. 7(c). The method of FIG. 9(a) may also be used to fabricate a plurality of DBR lasers (not shown).

In this method, the lasers are integrated monolithically on a substrate, for example a si-InP substrate. A si-InP substrate is used to create a lateral junction, in which all the current flows between the lateral n- and p-contacts.

In step S301, a buffer layer 206 is grown followed by an active area structure. In one embodiment, the buffer layer is 200 nm thick. In one embodiment, the buffer layer is semi insulating InP. The active area structure could comprise a multi quantum well (MQVV) structure as described in relation to previous figures. This step is referred to as "0-level growth".

The sample is then taken out of the growth machine for step S302, "0-level fabrication". This involves deposition of a dielectric hard mask, which can be a $Si_3N_4$ or $SiO_2$ layer. The thickness of this dielectric layer may be dependent on the thickness of the active area grown and the dry etch selectivity. Next, a photo resist is spun and an n-trench area is defined by optical lithography. After development, the pattern defined in the resist is transferred to the dielectric layer, for example through dry etching based on $CF_4$ or $CHF_3$ chemistry. Next, the remaining resist on the surface is removed in resist remover solution or by $O_2$ plasma washing. Next, a semiconductor dry etch is carried out. $Cl_2$ based chemistry may be used to provide good quality vertical sidewalls.

According to one example, the semiconductor dry etch described above for S302 may be used to form isolation trenches between adjacent lasers in an array, according to the device described in relation to FIG. 8(d).

According to another example, "0-level fabrication" can include two further steps: "OA-level growth" and "OA-level fabrication". In "OA-level growth" involves the growth of a semi insulating InP layer. After growth, a dielectric hard mask (which can be $Si_3N_5$ or $SiO_2$ as above) is deposited and the hard mask is patterned using for example the same process as for step S302. A semiconductor dry etch is again carried out as per S302 to remove the semiconductor from unwanted areas, such as the areas containing the lasers.

The sample is then ready for step S303, "1-level overgrowth". The dielectric hard mask is left on the area outside of the n-trench. This will provide selective area growth. The n-type layer 228 is grown in the n-trench and the etched area is planarized. The n-type layer 228 may be InP for example.

In step S304, "1-level fabrication" the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and the dry etch selectivity. A photoresist is spun to define a p-trench area by optical lithography and developed. The pattern is transferred to dielectric layer by dry etching, for example based on $CHF_3$ or $CF_4$ chemistry. The resist is then removed, as before. The p-trench area is then dry etched based on $Cl_2$ chemistry.

Step S305, "2-level overgrowth" involves growing an epitaxial p-type layer 230 on top of the etched p-trench area. The p-type layer 230 may be InP for example. The dielectric layer left in previous growth steps enables selective area epitaxy.

Step S306, "2-level fabrication" involves removing the dielectric hard mask by HF dip or dry etching. For a DFB laser, a new dielectric layer is deposited which is then spun with resist and electron beam patterned with grating pattern. This is then dry or wet etched into the dielectric area.

In the final steps n- and p-type contacts are defined on top of the n- and p-type trenches respectively by optical lithography. Appropriate metals for n- and p-contacts are deposited, lifted off and annealed.

Similar devices can be fabricated in two independent runs, diced and then flip chip mounted and aligned on a foreign platform. For example, two InP-based lasers can be flip chip mounted onto a common Si carrier substrate.

Figure 9:
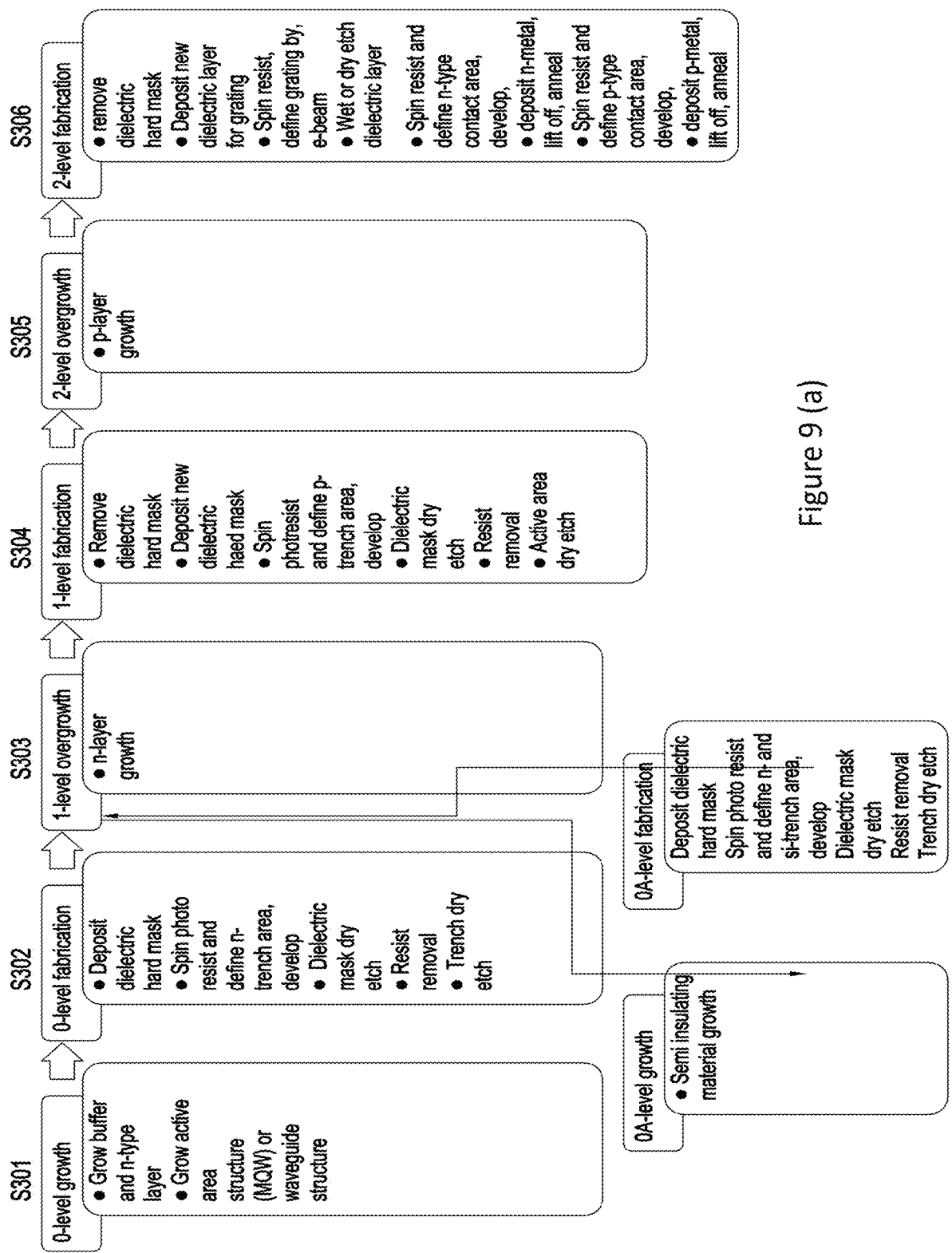
FIG. 9(a) is a flow chart of a method of growth and fabrication of monolithically integrated lasers in accordance with an embodiment.
FIG. 9(b) shows the structure of a device after selected steps of the process of FIG. 9(a), for an optical device having DFB lasers.
Figure 9:
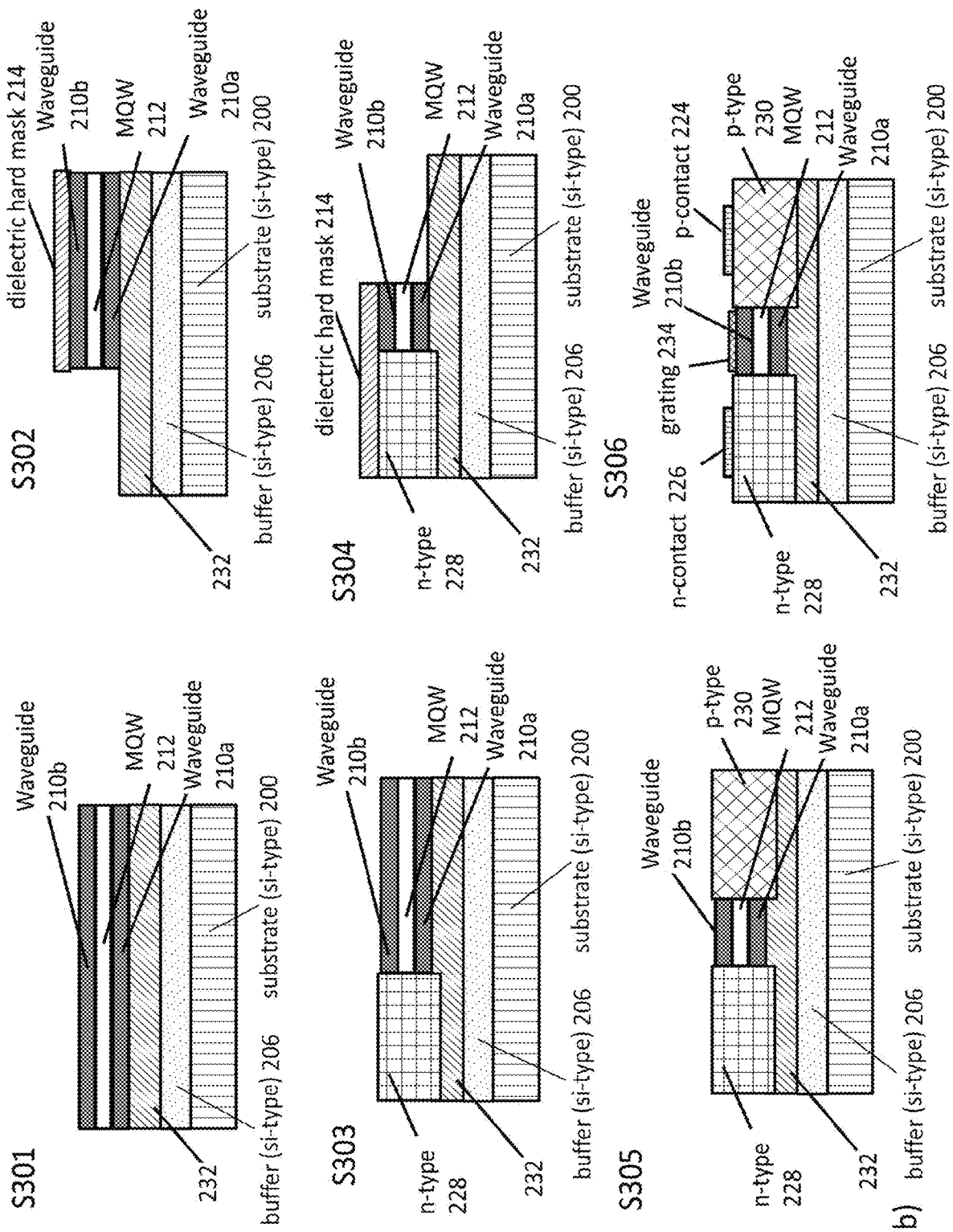

FIG. 9 (b) shows the structure of the sample after the steps of FIG. 9 (a), for an optical device having DFB lasers.

After step S301, the sample comprises a substrate 200, a buffer layer 206 overlying and in contact with the substrate 200, a layer 232 overlying and in contact with the buffer layer 206, a first waveguide layer 210a overlying and in contact with the layer 232, an MQW layer 212 overlying and in contact with the first waveguide layer 210a and a second waveguide layer 210b overlying and in contact with the MQW layer 212.

After step S302, a plateau comprising the dielectric hard mask 214, second waveguide layer 210b, MQW layer 212 and first waveguide layer 210a is overlying and in contact with part of the layer 232.

After step S303, the n-type layer 228 is overlying and in contact with the layer 232, adjacent to the plateau, and the dielectric hard mask 214 has been removed.

After step S304, there is a plateau comprising the dielectric hard mask 214, overlying and in contact with the n-type layer 228 and the stack comprising the second waveguide layer 210b, MQW layer 212 and first waveguide layer 210a. The plateau is overlying and in contact with part of the layer 232.

After step S305, the n-type layer 228; stack comprising the second waveguide layer 210b, MQW layer 212 and first waveguide layer 210a; and the p-type layer 230 are overlying and in contact with the layer 232. The n-type layer 228 is adjacent to one side of the stack and the p-type layer 230 is adjacent to the opposite side of the stack.

After step S306, a grating is formed on the second waveguide layer 210b. A p-contact metal 224 is overlying and in contact with the p-type layer 230. An n-contact metal 226 is overlying and in contact with the n-type layer 228.

Figure 10:
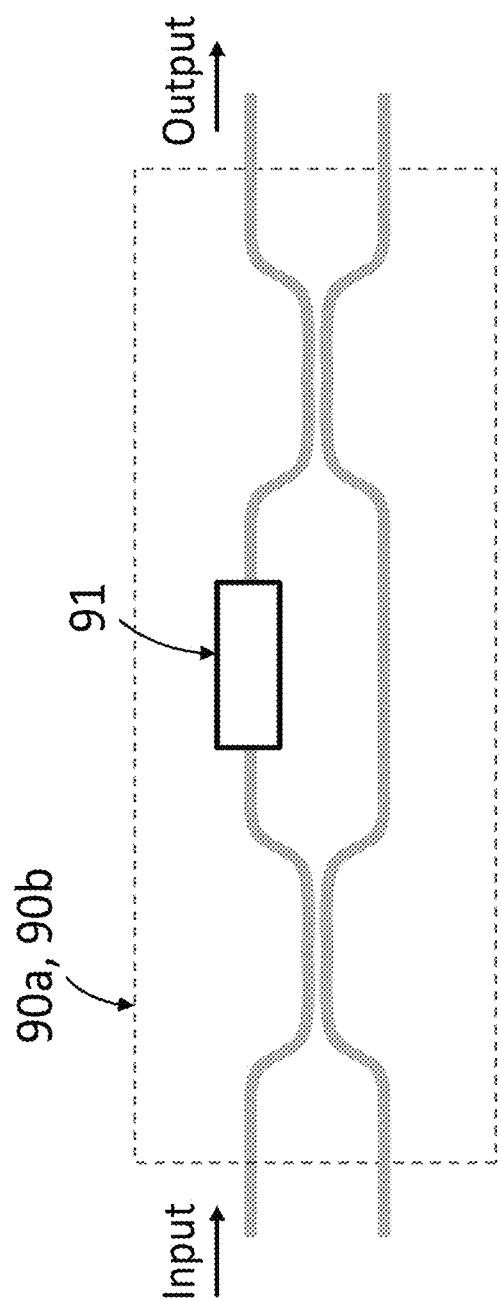
FIG. 10 is a schematic illustration of a Mach Zehnder Interferometer (MZI) switch.

Returning to FIGS. 7 (a) and (b), the output of each DFB laser 100 is injected into an output light guiding region 110, the output light guiding region being connected to a MZI switch 90. A schematic illustration of a MZI switch 90 is shown in FIG. 10. The MZI switch may have two inputs and two outputs. However a single input and/or a single output may be used. At the input side, the inputs are evanescently coupled together and then split into two arms of the interferometer. One arm contains a phase modulator 91. The phase modulator 91 is configured to add a phase to the input light and the amount of phase added may be controlled. The light passing through the phase modulator interferes with the light that has not passed through the phase shifter and the amplitude of the light at each output of the MZI depends on the relative phase shift. By dynamically adjusting the phase shift of the phase modulator 91, the power splitting ratio may be controlled and the power transferred to each output may be controlled.

When a single input and a single output is used, the MZI switch operates as a variable optical attenuator (VOA). Referring to FIG. 7(a) the purpose of the MZI switches 90 connected to the DFB lasers 100 is to act as VOAs configured to equalise the powers of the pulses from each laser (by attenuating a higher amplitude pulse to that it is equal to the lower amplitude pulse).

When a single input and two outputs are used, as in the delay line interferometer 33 of FIG. 7(a), the MZI switch 90b controls the power splitting ratio. In the delay line interferometer 33, one arm contains a delay element 8, the delay element 8 being implemented by a delay line which may be a longer segment the waveguide relative to the waveguide in the reference arm. The delay lines are typically a few cm long (e.g. about 4.5 cm long for delays of 500 ps on InP, 8 cm on silicon nitride based substrate). The propagation loss in an on-chip delay line can be of 2 dB/cm on InP waveguide and 0.5 dB/cm on Si3N4 waveguide, causing an extra loss of 10 dB on InP and 4 dB on Si3N4. Therefore, to compensate for the extra loss, the MZI switch 90*b* is configured to split the power such that more light is transmitted in the long arm of the delay line interferometer relative to the reference arm.

The phase modulator 91 may be an electro-optic modulator, wherein the refractive index of the material is a function of applied electric field. Changes in refractive index result in changes in optical path length and results in changes in the phase shift applied by phase modulator. Different voltages are applied to the phase modulator so as to impart a different phase shift. A phase modulator such as described can comprise a crystal, such as a $LiNbO_3$ crystal, in which the refractive index is a function of electric field strength, and an electric field may be applied by applying a voltage to electrodes positioned around the $LiNbO_3$ crystal.

Alternatively, the phase modulator 91 may be a thermo-optic modulator, wherein the optical path length is a function of the temperature, and the temperature is varied for example, by means of micro heaters integrated on the substrate. Changes in optical path length result in changes in phase shift applied by the phase modulator.

Alternatively, the phase modulator 91 may be implemented by using a piezoelectric actuator. Phase modulation using a piezoelectric actuator requires a piezoelectric thin film deposited onto an optical waveguide. The piezoelectric thin film may be lead zirconate titanate (PZT) for example. Electrodes may be integrated on substrate around the PZT thin film and the optical waveguide. Upon application of a voltage on the electrodes the PZT thin film, an electric field is induced across the PZT film causing it to expand and apply a pressure onto the optical waveguide. The pressure on the optical waveguide induces a stress, which may result in a change in effective refractive index. Changes in refractive index result in changes in optical path length which results in changes in the phase shift applied by phase modulator.

The relative phase shift applied to the phase modulator 91 is set by a controller (not shown), configured to apply a control signal (a voltage for electro-optic or piezoelectric actuated phase modulator, or a current for a thermo-optic modulator) to the phase modulator 91 of the MZI switch 90.

Figure 11:
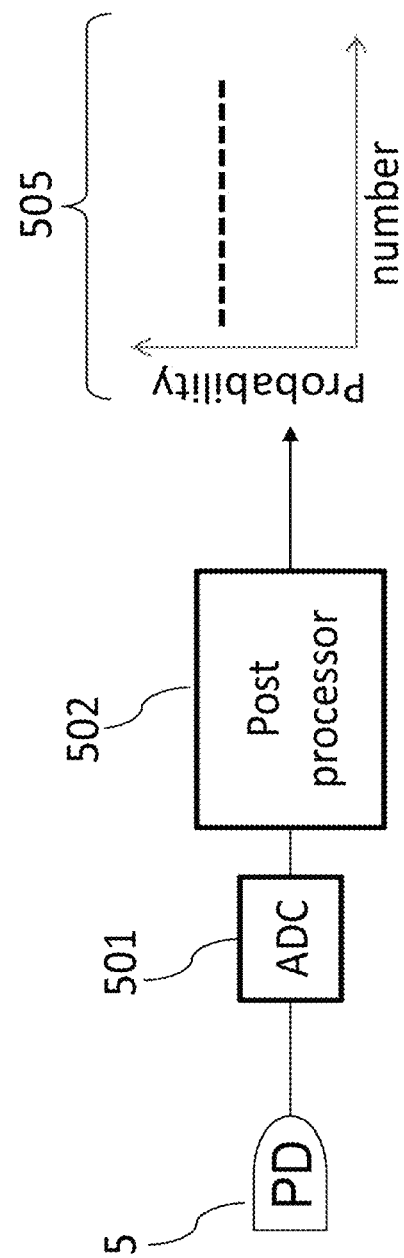
FIG. 11 shows the digitisation and processing of the output of the detector to obtain random numbers.

FIG. 11 shows a schematic illustration of a photodetector 5 coupled to an analog-to-digital converter (ADC) 501 that is further coupled to a post processor 502. The output of the post processor 502 is a sequence of random numbers having a uniform probability distribution 505.

According to an example, the photodetector 5 is configured to receive light from the output of the phase measurement element 3 or 33. The photodetector has a bandwidth at least equal to N×R, where N is the number of gain-switched lasers and R is the repetition rate of each gain-switched laser. For example, when R=5 GHz and N=2, such as described in relation to FIGS. 5(*a*) and 5(*b*), a suitable photodetector may be an InP based photodetector that typically has a bandwidth exceeding 20 GHz.

The ADC 501 converts the analog signal output by the photodetector 5 into a digital signal. According to one example, the ADC may be a 10-bit converter.

The output of the ADC 501 may not be used directly as random numbers since they are not uniformly distributed. The post processor 502 converts the raw data from the ADC into random numbers. The post processor 502 may implement a finite impulse response (FIR) filtering to convert the output of the ADC into random numbers.

The post processor may reduce the number of bits of the output data; for example if the ADC outputs a 10-bit data, the output of the post processor may be an 8-bit data stream.

If x(n) denotes the data output by the ADC and input into the post processor, the output y(n) is given by $y(n)=[b_0 x(n)+b_1 x(n-1)+\ldots+b_M x(n-M)] \mod 2^8$, where $b_i = M!/(i!(M-i)!)$ are binomial coefficients, and M=7 for example.

The post processor 502 may be a central processing unit (CPU), a graphical processing unit (GPU), or a field programmable gate array (FPGA). The FPGA may perform FIR filtering in real time. Other than filtering, the post processor may alternatively convert the raw output of the ADC 501 into random numbers by implementing a randomness extractor algorithm, which comprises a function that may be applied to a sequence of data that is not fully random in order to generate a sequence of highly random data having a uniform distribution. Examples of randomness extractor functions are Trevisan's and Toeplitz extractors.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical device for a quantum random number generator comprising:
 a source of phase randomised pulses of light, the source of phase randomised pulses of light further comprising
 a plurality of gain-switched lasers, each gain-switched laser having an output, and each gain-switched laser being configured to emit a stream of pulses such that the phase of each pulse in the stream of pulses is randomised, and
 an optical pulse combiner, the optical pulse combiner being configured to receive streams of pulses from the output of each gain-switched laser, combine the streams of pulses with one another into an interleaved stream of pulses and direct the interleaved stream of pulses into at least one output of the optical pulse combiner, the at least one output of the optical pulse combiner being the output of the source of phase randomised pulses of light,
 wherein the source of phase randomised pulses of light is configured such that the streams of pulses of light emitted by the plurality of gain-switched lasers are temporally offset relative to one another;
 a phase measurement element, the phase measurement element being configured to receive the interleaved stream of pulses from the output of the source of phase randomised pulses of light from the optical pulse combiner; and
 an optical detector, the optical detector being optically coupled to the phase measurement element,
 wherein the phase measurement element is a time delay interferometer and is configured to direct light from the at least one output of the source of phase randomised pulses towards two arms, at least one arm comprising an interferometer delay,
 wherein light from the two arms are interfered with each other and directed to the output of the phase measurement element, and
 wherein the interferometer delay is set to allow the interferometer to interfere two pulses from the interleaved stream of pulses from the output of the source of phase randomised pulses of light.

2. The optical device according to claim 1, wherein the source of phase randomised pulses of light is configured such that the stream of pulses of light from each gain-switched laser is directed into a delay element, each delay element providing a different amount of delay, and each delayed stream of pulses of light being directed into the optical pulse combiner.

3. The optical device according to claim 2, wherein the streams of pulses of light emitted by the plurality of gain-switched lasers are temporally synchronised.

4. The optical device according to claim 1, wherein modulation currents are injected into each of the plurality of gain-switched lasers and the modulation currents are temporally synchronised.

5. The optical device according to claim 1, wherein each gain-switched laser is configured to emit a stream of pulses of light such that the streams of pulses of light from each gain-switched laser are temporally offset relative to one another.

6. The optical device according to claim 5, wherein modulation currents are injected into each of the plurality of gain-switched lasers and the modulation currents are temporally offset relative to one another.

7. The optical device according to claim 1, wherein the interferometer delay in the phase measurement element is equal to a temporal separation between pulses in the stream of pulses emitted by each gain-switched laser.

8. The optical device according to claim 1, wherein the interferometer delay in the phase measurement element is equal to a temporal separation between adjacent pulses in the interleaved stream of pulses output at the least one output of the optical pulse combiner.

9. The optical device according to claim 1, wherein the interferometer delay in the phase measurement element is equal to an integer multiple of a temporal separation between adjacent pulses in the interleaved stream of pulses output at the least one output of the optical pulse combiner.

10. The optical device according to claim 7, wherein the pulses in the stream of pulses emitted by each gain-switched laser have a temporal separation greater than or equal to 200 ps.

11. The optical device according to claim 7, wherein the pulses in the stream of pulses emitted by each gain-switched laser have a width less than or equal to half the temporal separation between adjacent pulses in the stream of pulses output at the at least one output of the optical pulse combiner.

12. The optical device according to claim 1, wherein each gain-switched laser comprises a seed laser optically coupled to an output laser.

13. The optical device according to claim 1, wherein each gain-switched laser comprises a gain-switched laser optically coupled to a pulse carver.

14. The optical device according to claim 1, wherein the source of phase randomised pulses of light, the optical pulse combiner, the phase measurement element, and the optical detector are integrated on a first substrate.

15. The optical device according to claim 1, wherein:
the plurality of gain-switched lasers are disposed on a first substrate;
the optical pulse combiner and the phase measurement element are integrated on a second substrate; and
light emitted by the plurality of gain-switched lasers is optically coupled to the optical pulse combiner via an optical interconnect.

16. The optical device according to claim 14, wherein the first substrate comprises InP.

17. The optical device according to claim 16, wherein the second substrate comprises Si.

18. A method of generating random numbers, the method comprising:
generating phase randomised pulses of light from a source of phase randomised pulses of light, the source of phase randomised pulses of light further comprising
a plurality of gain-switched lasers, each gain-switched laser having an output, and each gain-switched laser being configured to emit a stream of pulses of light such that the phase of each pulse in the stream of pulses is randomised, and
an optical pulse combiner, the optical pulse combiner being configured to receive streams of pulses from the output of each gain-switched laser, combine the streams of pulses with one another into an interleaved stream of pulses and direct the interleaved stream of pulses into at least one output of the optical pulse combiner, the at least one output of the optical pulse combiner being the output of the source of phase randomised pulses of light,
wherein the source of phase randomised pulses of light is configured such that the streams of pulses of light emitted by the plurality of gain-switched laser is temporally offset relative to one another; and
measuring the phase of pulses from the source of phase randomised pulses by using a phase measurement element coupled to an optical detector, the phase measurement element being configured to receive the interleaved stream of pulses from the output of the source of phase randomised pulses of light,
wherein the phase measurement element is a time delay interferometer which directs light from the at least one output of the source of phase randomised pulses towards two arms, at least one arm comprising an interferometer delay,
wherein light from the two arms are interfered with each other and directed to the output of the phase measurement element, and
wherein the interferometer delay is set to allow the interferometer to interfere two pulses from the interleaved stream of pulses from the output of the source of phase randomised pulses of light.

19. The method of generating random numbers according to claim 18, wherein the numerical value provided by the photodetector is processed using a randomness extractor algorithm.

* * * * *